United States Patent
Worsham, II et al.

(10) Patent No.: US 10,611,463 B2
(45) Date of Patent: Apr. 7, 2020

(54) ROTORCRAFT FLY-BY-WIRE STABILIZATION

(71) Applicant: Textron Innovations Inc., Providence, RI (US)

(72) Inventors: Robert Earl Worsham, II, Weatherford, TX (US); Thomas Wayne Brooks, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 389 days.

(21) Appl. No.: 15/480,152

(22) Filed: Apr. 5, 2017

(65) Prior Publication Data

US 2018/0290733 A1 Oct. 11, 2018

(51) Int. Cl.
| | |
|---|---|
| *B64C 13/50* | (2006.01) |
| *B64C 27/57* | (2006.01) |
| *B64C 13/16* | (2006.01) |
| *G05D 1/08* | (2006.01) |
| *B64C 27/06* | (2006.01) |
| *B64C 27/14* | (2006.01) |
| *B64C 27/82* | (2006.01) |

(52) U.S. Cl.
CPC ............ *B64C 13/503* (2013.01); *B64C 13/16* (2013.01); *B64C 27/06* (2013.01); *B64C 27/14* (2013.01); *B64C 27/57* (2013.01); *B64C 27/82* (2013.01); *G05D 1/0816* (2013.01); *G05D 1/0858* (2013.01)

(58) Field of Classification Search
CPC ....... B64C 13/503; B64C 13/16; B64C 13/50; B64C 27/57; B64C 27/82; B64C 27/14; B64C 27/06; G05D 1/0816; G05D 1/0858; G05D 1/02; G05D 1/06
See application file for complete search history.

(56) References Cited

U.S. PATENT DOCUMENTS

| | | |
|---|---|---|
| 6,259,975 B1 | 7/2001 | Rollet et al. |
| 2007/0221780 A1 | 9/2007 | Builta |
| 2008/0075591 A1 | 3/2008 | Builta |
| 2008/0308682 A1 | 12/2008 | Builta et al. |
| 2014/0361118 A1 | 12/2014 | Schaeffer et al. |
| 2016/0291598 A1 | 10/2016 | Youmans |

FOREIGN PATENT DOCUMENTS

| | | |
|---|---|---|
| EP | 0455580 A2 | 11/1991 |
| JP | 2007290646 | 8/2007 |

*Primary Examiner* — Assres H Woldemaryam
(74) *Attorney, Agent, or Firm* — Slater Matsil, LLP

(57) ABSTRACT

A rotorcraft with a fly-by-wire system includes a computing device having control laws. The control laws are operable to engage a stabilization maneuver in response to a perturbation of an otherwise stable operating condition of the rotorcraft, thereby returning the rotorcraft to the stable operating condition without requiring input from the pilot. One or more control laws are further operable to increase or decrease pitch angle, roll angle, yaw rate, or collective pitch angle. In representative aspects, perturbation of the stable operating condition may occur as a result of transient meteorological conditions (e.g., wind shear, wind gust, turbulence) experienced by a rotorcraft engaged in flight operations at airspeeds between 0 knots (e.g., a hover) and about 60 knots. The control laws are further operable to permit the rotorcraft to operate with Instrument Meteorological Conditions (IMC) approval at substantially all airspeeds within a normal flight envelope of the rotorcraft.

19 Claims, 13 Drawing Sheets

ROTORCRAFT FLY-BY-WIRE STABILIZATION

TECHNICAL FIELD

The present disclosure generally relates to aircraft flight control systems, and more particularly, to rotorcraft fly-by-wire (FBW) control laws.

BACKGROUND

A rotorcraft may include one or more rotor systems. Examples of rotor systems include main rotor systems and tail rotor systems. A main rotor system may generate aerodynamic lift to support the weight of the rotorcraft in flight, and thrust to counteract aerodynamic drag and to move the rotorcraft in forward flight. A tail rotor system may generate thrust in correspondence to rotation of the main rotor system in order to counter torque created by the main rotor system.

US 2008/075591 A1 discloses a method for automatically reducing the effect of a component of an external force that is laterally incident on a rotorcraft. A signal of the rotorcraft indicative of and proportional to the component is monitored. An absolute value of the signal and a preset high limit are compared. If the absolute value is greater than the preset high limit, manual heading control of the rotorcraft is disabled and the heading of the rotorcraft is adjusted with respect to the external force so as to decrease the lateral component of the external force experienced by the rotorcraft.

US 2014/361118 A1 discloses a method of limiting vertical axis augmentation in a rotorcraft, the method comprising: measuring a torque with a sensor; deriving a comparison of the torque to a lower torque limit, using a computer processor; and adjusting a vertical axis control command based upon the comparison of the torque to the lower torque limit.

U.S. Pat. No. 6,259,975 B1 discloses a flight control system for an aircraft, particularly for a helicopter receives a number of items of information, especially the position of flight control members of said aircraft, and sends, depending on these items of information, control inputs to controls of the aircraft. The flight control system includes at least one sensor which measures values representative of the flight of the aircraft and computing means which generate, at least from these measured values and from the positions of flight control members, corrected control inputs which are sent to the controls and which enable control of the lateral speed of the aircraft with respect to the ground, without varying the course of the aircraft.

US 2016/291598 A1 discloses a flight vehicle control and stabilization process that detects and measures an orientation of a non-fixed portion relative to a fixed frame or portion of a flight vehicle, following a perturbation in the non-fixed portion from one or both of tilt and rotation thereof. A pilot or rider tilts or rotates the non-fixed portion, or both, to intentionally adjust the orientation and effect a change in the flight vehicle's direction. The flight vehicle control and stabilization process calculates a directional adjustment of the rest of the flight vehicle from this perturbation and induces the fixed portion to re-orient itself with the non-fixed portion to effect control and stability of the flight vehicle. The flight vehicle control and stabilization process also detects changes in speed and altitude, and includes stabilization components to adjust flight vehicle operation from unintentional payload movement on the non-fixed portion.

US 2008/308682 A1 discloses a flight control system for an aircraft that receives a selected value of a first parameter, which is either the airspeed or inertial velocity of the aircraft. A primary feedback loop generates a primary error signal that is proportional to the difference between the selected value and a measured value of the first parameter. A secondary feedback loop generates a secondary error signal that is proportional to the difference between the selected value of the first parameter and a measured value of a second flight parameter, which is the other of the airspeed and inertial velocity. The primary and secondary error signals are summed to produce a velocity error signal, and the velocity error signal and an integrated value of the primary error signal are summed to produce an actuator command signal. The actuator command signal is then used for operating aircraft devices to control the first parameter to minimize the primary error signal.

US 2007/221780 A1 discloses a method and apparatus for automatically controlling the flight of a tiltrotor aircraft while the aircraft is in flight that is at least partially rotor-borne. The method and apparatus provide for automatically tilting nacelles in response to a longitudinal-velocity control signal so as to produce a longitudinal thrust-vector component for controlling longitudinal velocity of the aircraft. Simultaneously, cyclic swashplate controls are automatically actuated so as to maintain the fuselage in a desired pitch attitude. The method and apparatus also provide for automatically actuating the cyclic swashplate controls for each rotor in response to a lateral velocity control signal so as to produce a lateral thrust-vector component for controlling lateral velocity of the aircraft. Simultaneously, collective swashplate controls for each rotor are automatically actuated so as to maintain the fuselage in a desired roll attitude. The method and apparatus provide for yaw control through differential longitudinal thrust produced by tilting the nacelles.

JP 2007 290646 discloses a solution to keep an unmanned helicopter at a stable attitude even when it has a suddenly rising cross-wind. This is done by bringing the nose of the unmanned helicopter nearby into line with a windward direction as shown by a sign a when it has the suddenly rising crosswind, for instance, at the time of circling during a high speed flight while receiving a following wind. Thus, the project area of the body receiving the wind is decreased, and the wind is dissipated. Therefore, the roll angle of the body can be reduced, and consequently, the attitude of the unmanned helicopter 1 can be stabilized.

EP 0 455 580 A2 discloses a ground-plane-referenced, acceleration signal and Doppler velocity signal utilized by a complementary filter to provide a complementary velocity signal which is transformed to an inertial coordinate referenced velocity signal utilized in combination with a GPS position signal by a complementary filter to provide a complementary, position error signal that is transformed to a ground-plane-referenced, position error signal and summed with a wind speed signal calculated from the difference between air speed and the aforementioned complementary velocity signal to provide a pitch command signal. A similar system is utilized to provide a roll command signal. The system is gated by signals which are determinative of the aircraft meeting predetermined flight conditions.

SUMMARY

A system of one or more computers can be configured to perform particular operations or actions by virtue of having software, firmware, hardware, or a combination thereof installed on the system that in operation cause or causes the system to perform the actions. One or more computer programs may be configured to perform particular operations or actions by virtue of including instructions that, when executed by a data processing apparatus, cause the apparatus to perform the actions.

A representative aspect involves a fly-by-wire (FBW) system including a rotorcraft flight control computer (FCC) having a control law. The control law is operable to stabilize a rotorcraft in response to a stabilization command. The stabilization command is configured to return the rotorcraft to a first operating condition from a second operating condition, where the second operating condition corresponds to a perturbation of the first operating condition. Other embodiments of this aspect include corresponding computer systems, apparatuses, and computer programs recorded on one or more computer storage devices, each configured to perform actions of the methods.

Another representative aspect relates to a method that includes a step of operating a rotorcraft in a first operating condition of a flight control system (FCS), where the rotorcraft has an FCC in electrical communication between the FCS and a pilot control assembly (PCA). The FCC is configured to sense an unintended perturbation of the first operating condition. The method also includes, in response to the FCC sensing the unintended perturbation, the FCC engaging a stabilization maneuver. In response to the FCC engaging the stabilization maneuver, the FCC transitions to a second operating condition of the FCS, where the second operating condition is configured to return the rotorcraft to the first operating condition. Other embodiments of this aspect include corresponding computer systems, apparatuses, and computer programs recorded on one or more computer storage devices, each configured to perform actions of the methods.

Yet another representative aspect includes a rotorcraft having a power train coupled to a body. The power train includes a power source and a drive shaft coupled to the power source. The rotorcraft also includes a rotor system coupled to the power train. The rotorcraft has a plurality of rotor blades. It will be noted, however, that various rotorcraft embodiments may or may not include tail rotor blades (e.g., NOTAR embodiments). The rotorcraft also includes an FCS operable to change at least one operating condition of the rotor system. The rotorcraft also has a PCA configured to receive commands from a pilot. The FCS is a fly-by-wire system in electrical communication with the PCA. An FCC is in electrical communication between the FCS and the PCA. The FCC is configured to sense a stable state of the rotorcraft, where the stable state corresponds to a first operating condition. The FCC is further configured to sense an unintended perturbation of the stable state of the rotorcraft. In response to sensing the unintended perturbation, the FCC is configured to engage a stabilization maneuver. In response to engaging the stabilization maneuver, the FCC transitions from the first operating condition to a second operating condition of the rotor system, where the second operating condition of the rotor system is configured to return the rotorcraft to the stable state. Other embodiments of this aspect include corresponding computer systems, apparatuses, and computer programs recorded on one or more computer storage devices, each configured to perform actions of the methods.

Representative embodiments of the present disclosure may provide one or more technical advantages. A technical advantage of one embodiment may include a capability to improve pilot control of a rotorcraft and reduce pilot workload. Another technical advantage of an embodiment may include a capability to decouple or separate rotorcraft motions corresponding to different flight characteristics in order to engage a stabilization maneuver with reduced pilot workload. Yet another technical advantage of an embodiment may include a capability to initiate a stabilization maneuver in response to perturbation of a stable operating condition with minimal, or otherwise reduced, input from a pilot.

Certain embodiments may include some, all, or none of the above advantages. One or more other technical advantages may be readily apparent to those skilled in the art upon review of the Figures, descriptions, and claims included herein.

BRIEF DESCRIPTION OF THE DRAWINGS

Representative aspects of the present disclosure may be understood from the following detailed description when read in conjunction with the accompanying Figures. It is noted that, in accordance with standard practice in the industry, various features may not be drawn to scale. For example, dimensions of various features may be arbitrarily increased or reduced for clarity of illustration or description. Corresponding numerals and symbols in different Figures generally refer to corresponding pails, unless otherwise indicated.

DETAILED DESCRIPTION

Representative embodiments are discussed in detail below. It should be appreciated, however, that concepts disclosed herein may be embodied in a variety of contexts, and that specific embodiments discussed herein are merely illustrative and are not intended to limit the scope of the claims. Furthermore, it should be understood that various changes, substitutions, and alterations can be made herein without departing from the spirit and scope as defined by the appended claims.

Figure 1:
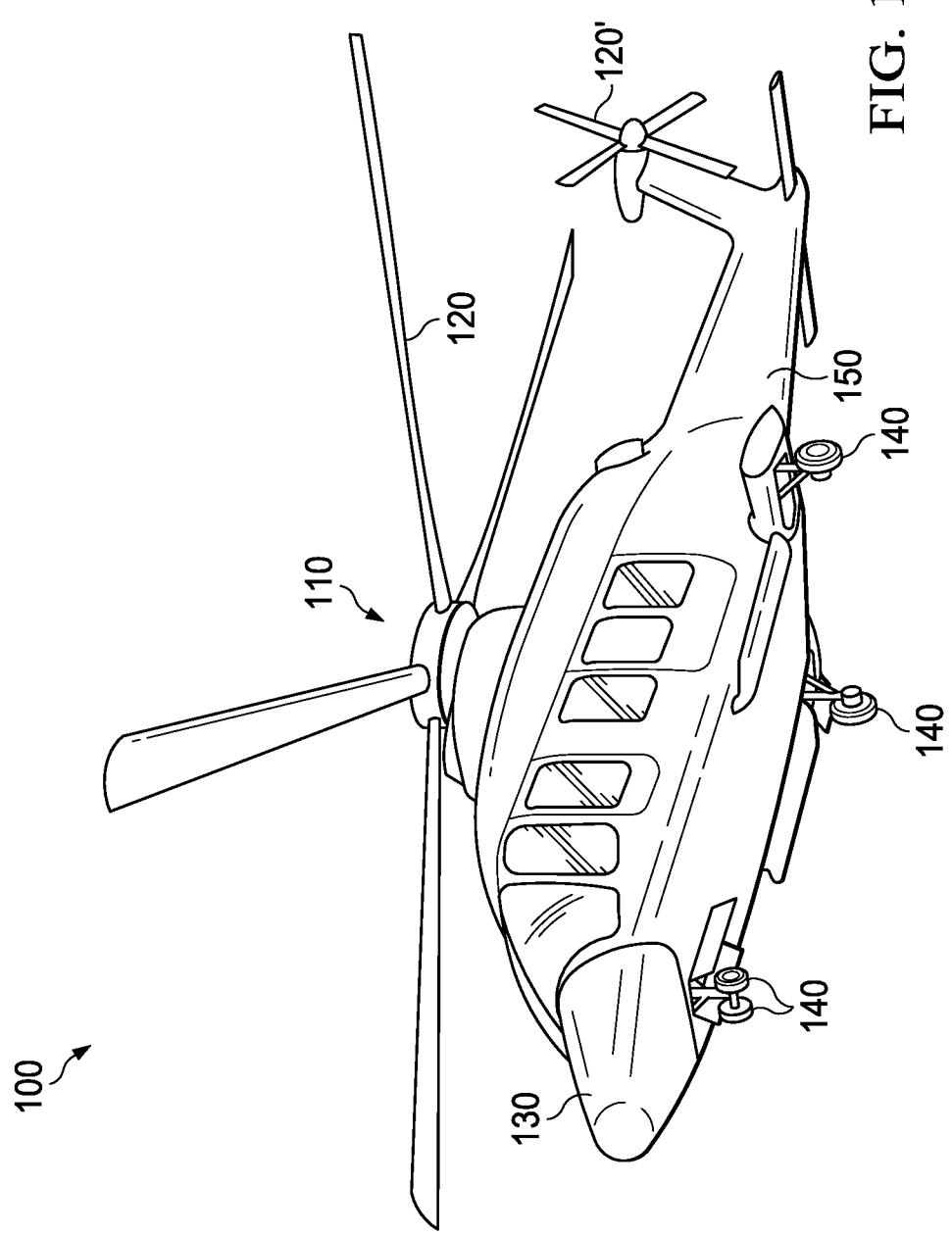
FIG. 1 representatively illustrates a rotorcraft in accordance with an embodiment.

FIG. 1 illustrates a rotorcraft 100 according to a representative embodiment. Rotorcraft 100 includes rotor system 110, main rotor blades 120, fuselage 130, landing gear 140, and tail boom 150. Rotor system 110 may rotate main rotor blades 120. Rotor system 110 may include a control system for selectively controlling pitch of each blade 120 in order to selectively control direction, thrust, and lift of rotorcraft 100. Fuselage 130 comprises the body of rotorcraft 100 and may be coupled to rotor system 110 such that rotor system 110 and main rotor blades 120 move fuselage 130 through the air in flight. Landing gear 140 support rotorcraft 100 during landing or when rotorcraft 100 is at rest on the ground. Tail boom 150 represents the rear section of rotorcraft 100 and has components of rotor system 110 and tail rotor blades 120'. Tail rotor blades 120' counter torque effect created by rotor system 110 and main rotor blades 120. Teachings of certain embodiments relating to rotor systems described herein may apply to rotor system 110 or other rotor systems, such as other tilt rotor or helicopter rotor systems. It should also be appreciated that representative embodiments of rotorcraft 100 may apply to aircraft other than rotorcraft, such as airplanes and unmanned aircraft, or the like.

A pilot may manipulate one or more pilot flight controls in order to achieve controlled aerodynamic flight. Inputs provided by the pilot to the pilot flight controls may be transmitted mechanically or electronically (for example, via a fly-by-wire system) to flight control devices. Flight control devices may include devices operable to change flight characteristics of the aircraft. Representative flight control devices may include a control system operable to change a configuration of main rotor blades 120 or tail rotor blades 120'.

Figure 2:
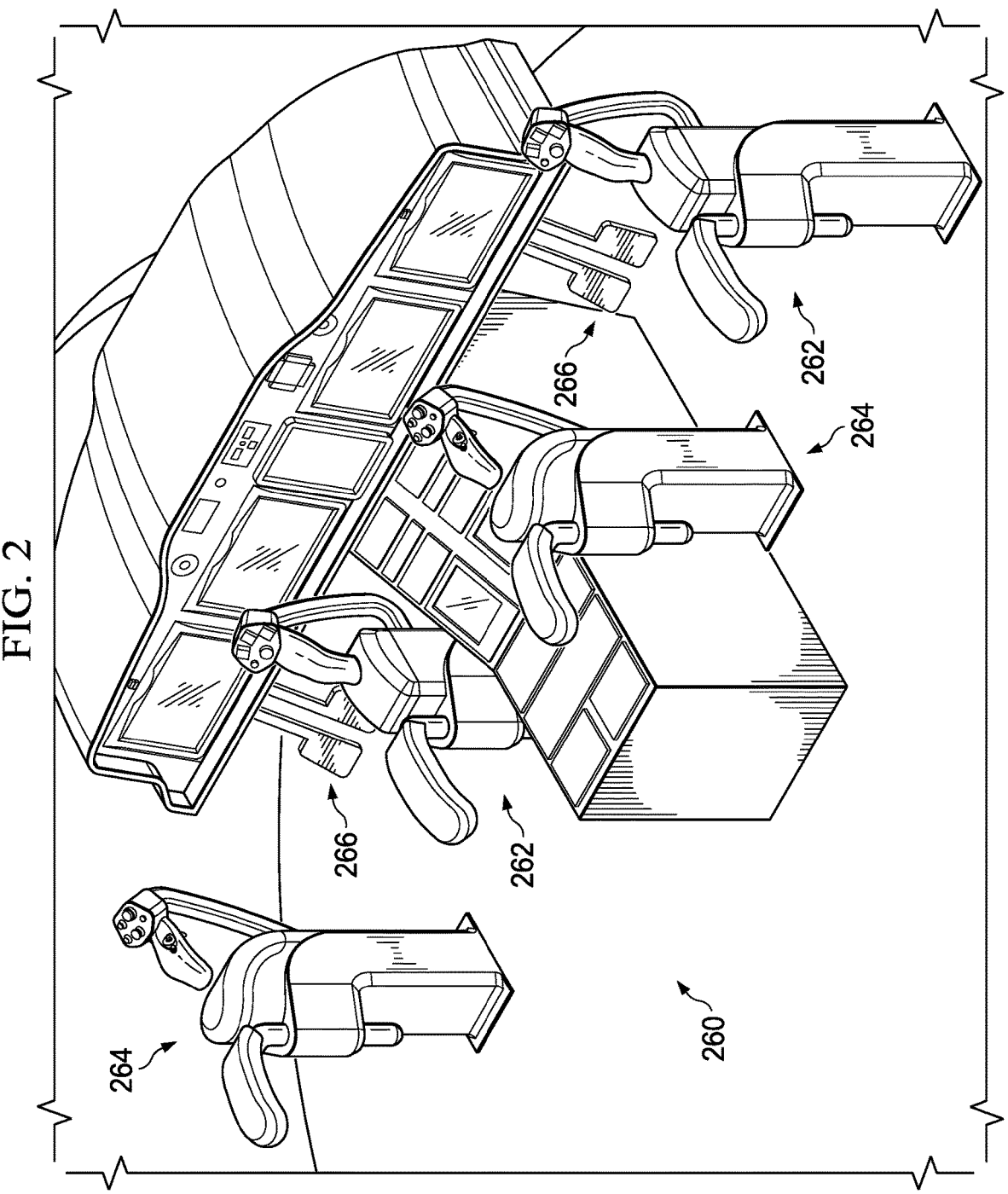
FIG. 2 representatively illustrates a cockpit configuration in accordance with an embodiment.

FIG. 2 illustrates a cockpit configuration 260 of rotorcraft 100 according to a representative embodiment. Rotorcraft 100 may include, e.g., three sets of pilot flight controls (e.g., cyclic control assemblies 262, collective control assemblies 264, and pedal assemblies 266). In accordance with a representative embodiment, a set comprising each different pilot flight control assembly is provided for a pilot and a co-pilot (both of which may be referred to as a "pilot" for purposes of discussion herein).

In general, cyclic pilot flight controls may allow a pilot to impart cyclic configurations to main rotor blades 120. Varied cyclic configurations of main rotor blades 120 may cause rotorcraft 100 to tilt in a direction specified by the pilot. For tilting forward and back (pitch) or tilting sideways (roll), the angle of attack of main rotor blades 120 may be altered with cyclic periodicity during rotation of rotor system 110, thereby creating variable amounts of lift at varied points in the rotation cycle. Alteration of cyclic configuration of main rotor blades 120 may be accomplished by input from cyclic control assembly 262.

Collective pilot flight controls may allow a pilot to impart collective configurations (e.g., collective blade pitch) to main rotor blades 120. Collective configurations of main rotor blades 120 may change overall lift produced by main rotor blades 120. For increasing or decreasing overall lift in main rotor blades 120, the angle of attack for all main rotor blades 120 may be collectively altered by equal amounts and at the same time, resulting in ascent, descent, acceleration, and deceleration. Alteration of collective configuration of main rotor blades 120 may be accomplished by input from collective control assembly 264.

Anti-torque pilot flight controls may allow a pilot to change the amount of anti-torque force applied to rotorcraft 100. Tail rotor blades 120' may operate to counter torque created by rotor system 110 and main rotor blades 120. Anti-torque pilot flight controls may change the amount of anti-torque force applied to change a heading (yaw) of rotorcraft 100. For example, providing anti-torque force greater than the torque effect created by rotor system 110 and main rotor blades 120 may cause rotorcraft 100 to rotate in a first direction, whereas providing anti-torque force less than the torque effect created by rotor system 110 and main rotor blades 120 may cause rotorcraft 100 to rotate in a second direction opposite the first direction. In some embodiments, anti-torque pilot flight controls may change the amount of anti-torque force applied by changing the pitch of tail rotor blades 120', thereby increasing or reducing thrust produced by tail rotor blades 120' and causing the nose of rotorcraft 100 to yaw in a direction corresponding to application of input from pedal assembly 266.

In other embodiments, rotorcraft 100 may include additional or different anti-torque devices, such as a rudder or a no-tail-rotor (NOTAR) anti-torque device. Conjunctive or alternative anti-torque embodiments may be operable to change an amount of anti-torque force provided by such additional or different anti-torque device.

In some embodiments, cyclic control assembly 262, collective control assembly 264, and pedal assemblies 266 may be used in a fly-by-wire (FBW) system. In an example as representatively illustrated in FIG. 2, each cyclic control assembly 262 is located to the right of a pilot seat, each collective control assembly 264 is located to the left of a pilot seat, and each pedal assembly 266 is located in front of a pilot seat. In other embodiments, cyclic control assemblies 262, collective control assemblies 264, and pedal assemblies 266 may be located in any suitable location of a cockpit configuration.

In some embodiments, cyclic control assembly 262, collective control assembly 264, and pedal assemblies 266 may be in mechanical communication with trim assemblies that convert mechanical inputs into FBW system flight control commands. These trim assemblies may include, among other items, measurement devices for measuring mechanical inputs (e.g., measuring or otherwise determining input position) and trim motors for back-driving center positions of cyclic control assembly 262, collective control assembly 264, or pedal assemblies 266.

Figure 3:
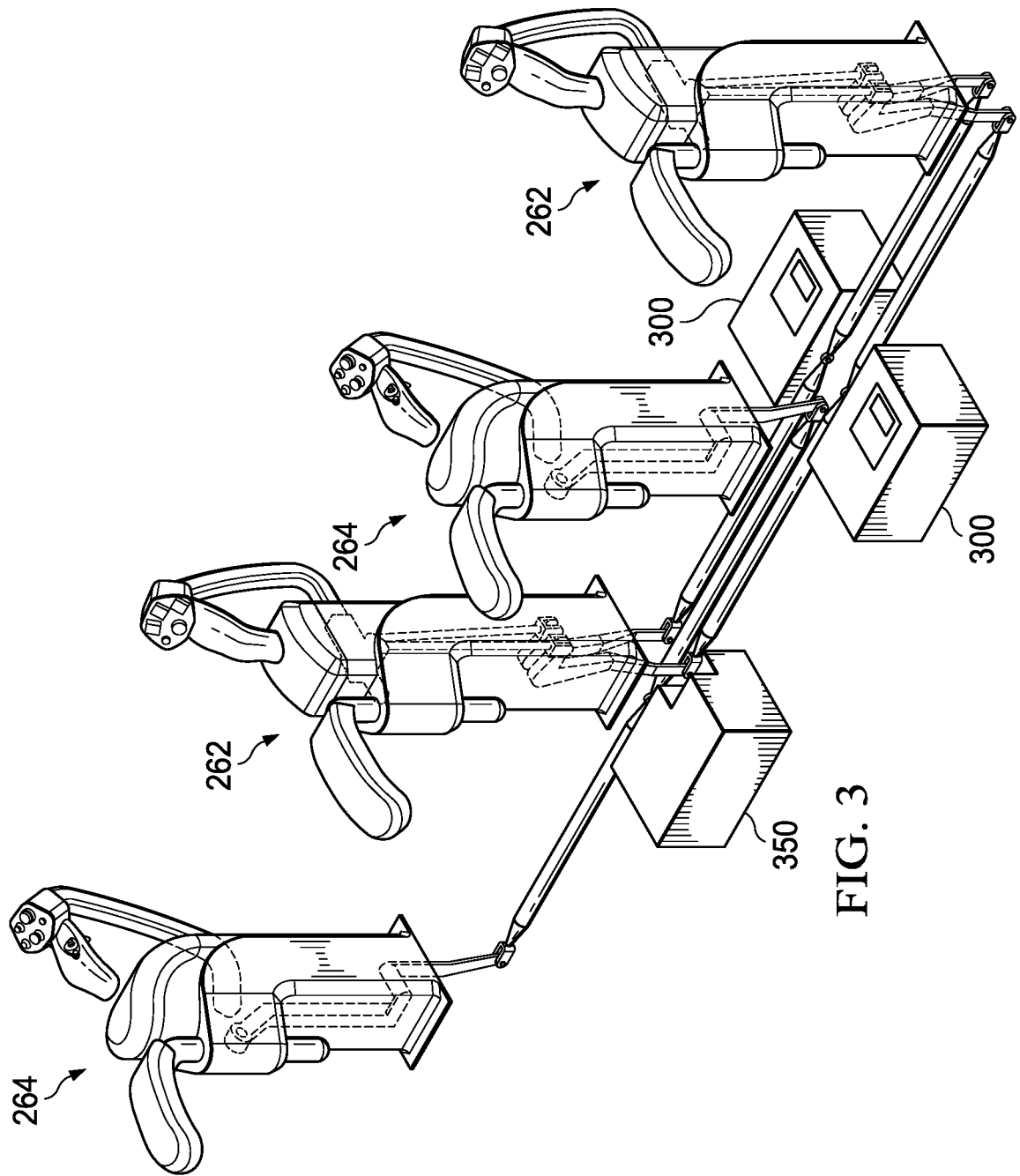
FIG. 3 representatively illustrates an installation of cyclic control assemblies and collective control assemblies in accordance with an embodiment.

For example, FIG. 3 representatively illustrates an installation of two cyclic control assemblies 262 and two collective control assemblies 264 according to an embodiment. In this example, the cyclic control assemblies 262 and collective control assemblies 264 are coupled to three integrated trim assemblies: two cyclic trim assemblies 300 and a collective trim assembly 350. One of the cyclic trim assemblies 300 manages left/right cyclic tilting movements (e.g., roll) and the other cyclic trim assembly 300 manages front/back cyclic tilting movements (e.g., pitch).

Cyclic trim assemblies 300 and collective trim assembly 350 are operable to receive and measure mechanical communications of cyclic and collective motions from a pilot. In a representative aspect, cyclic trim assemblies 300 and collective trim assembly 350 may embody components of a FBW flight control system, and measurements from cyclic trim assemblies 300 and collective trim assembly 350 may be sent to a flight control computer (FCC) operable to instruct rotor system 110 to change a position of main rotor blades 120 based on received or otherwise determined measurements. For example, the FCC may be in communication with actuators or other devices operable to change the pitch or position of main rotor blades 120.

Figure 4:
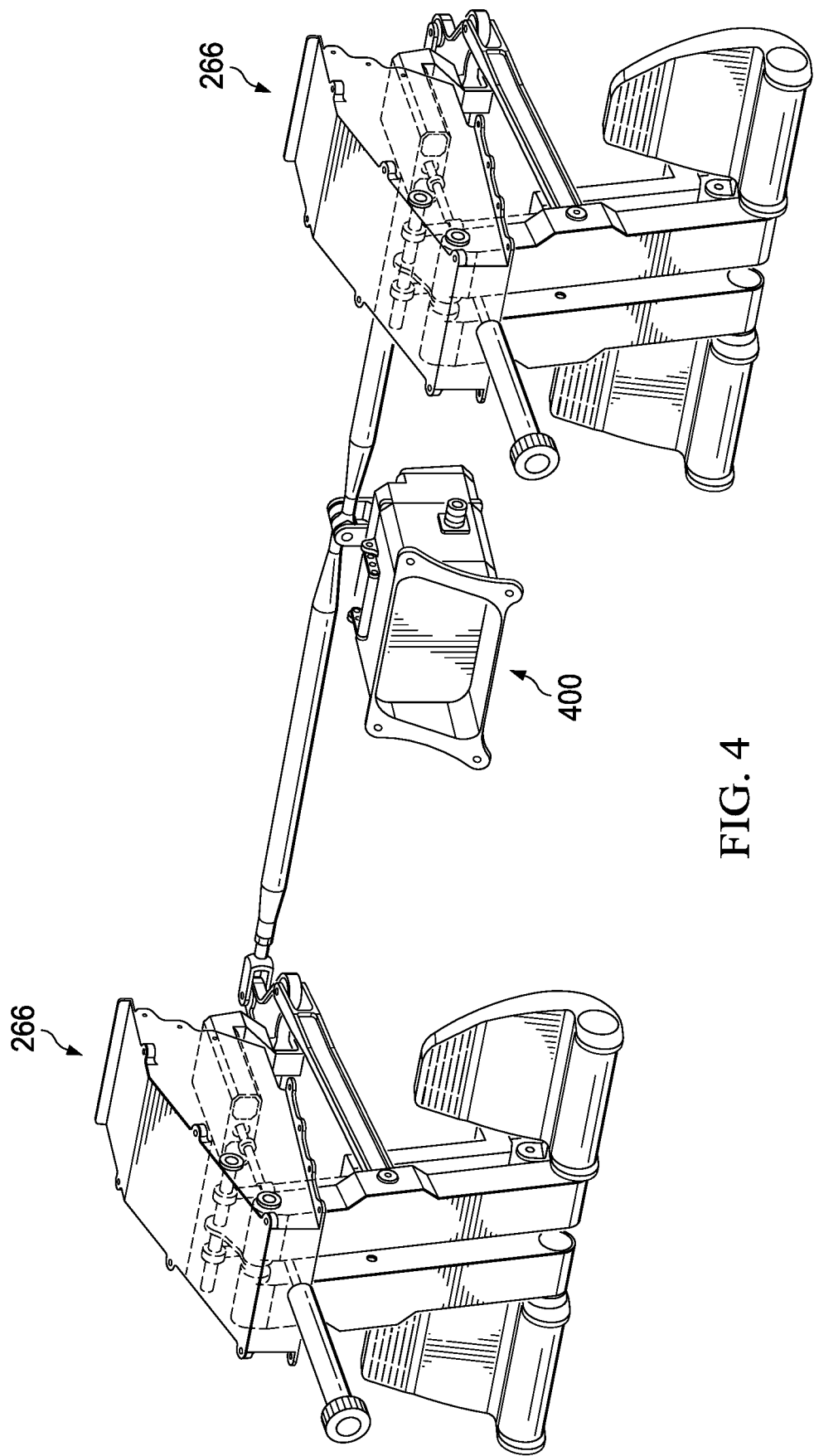
FIG. 4 representatively illustrates an installation of pedal assemblies in accordance with an embodiment.

FIG. 4 representatively illustrates an installation of pedal assemblies 266 in accordance with an embodiment. Two pedal assemblies 266 are coupled to an anti-torque trim assembly 400. Pedal linkages are in mechanical communication, e.g., via a rocker arm and pedal adjustment linkages. The rocker arm is operable to rotate about a point of rotation such that pushing in one pedal causes the pedal adjustment linkage to rotate the rocker arm, which in turn causes the pedal adjustment linkage to push out the other pedal in an opposite direction.

Rotating the rocker arm also causes a trim linkage to reposition a mechanical input associated with anti-torque trim assembly 400. In this manner, the pilot can mechanically communicate anti-torque commands to anti-torque trim assembly 400 by moving the pedals. Furthermore, trim linkages couple adjacent pedal assemblies 266 together such that pilot pedals and co-pilot pedals are in mechanical communication.

Figure 5:
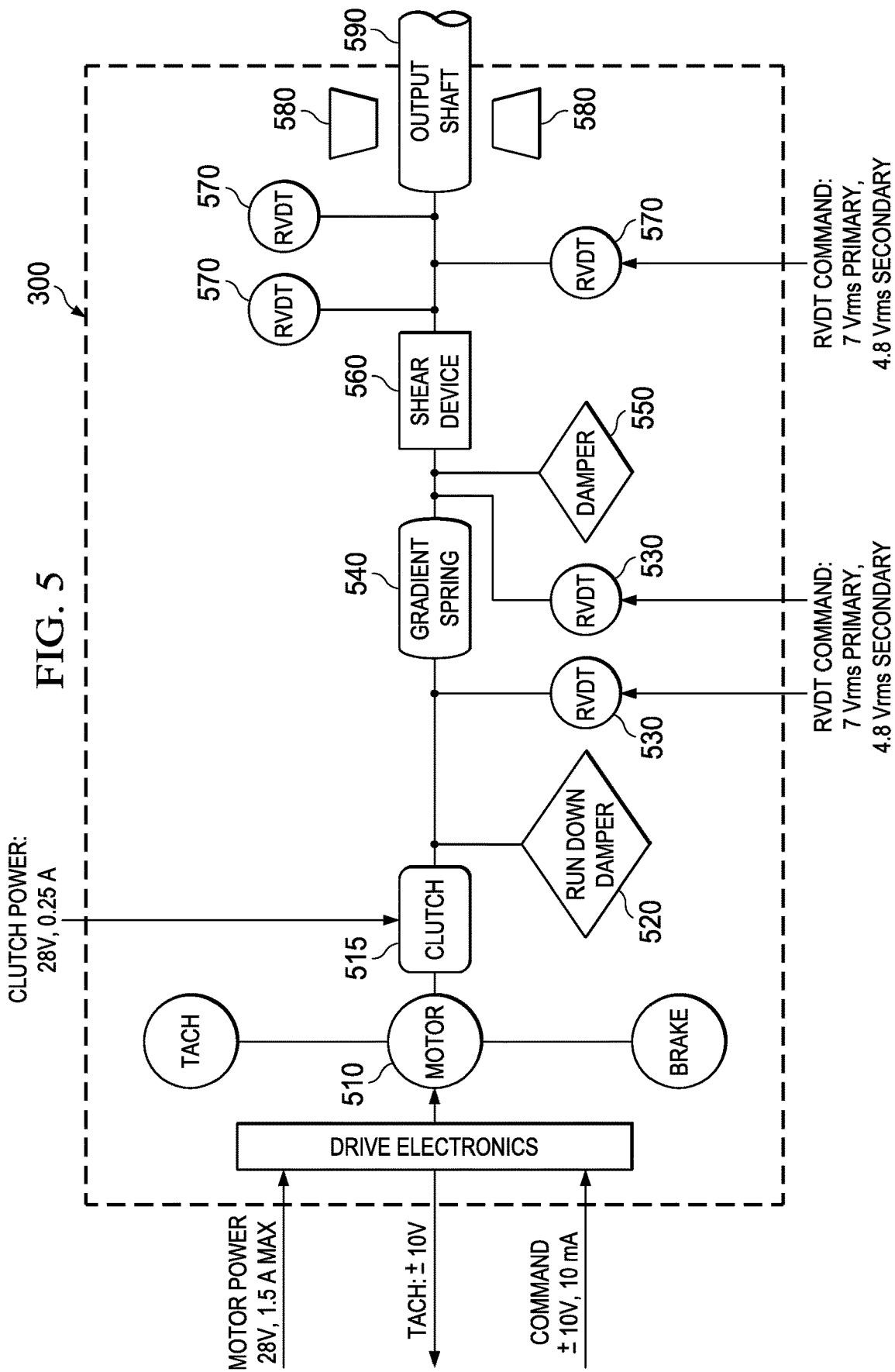
FIG. 5 representatively illustrates a cyclic trim assembly in accordance with an embodiment.
Figure 6:
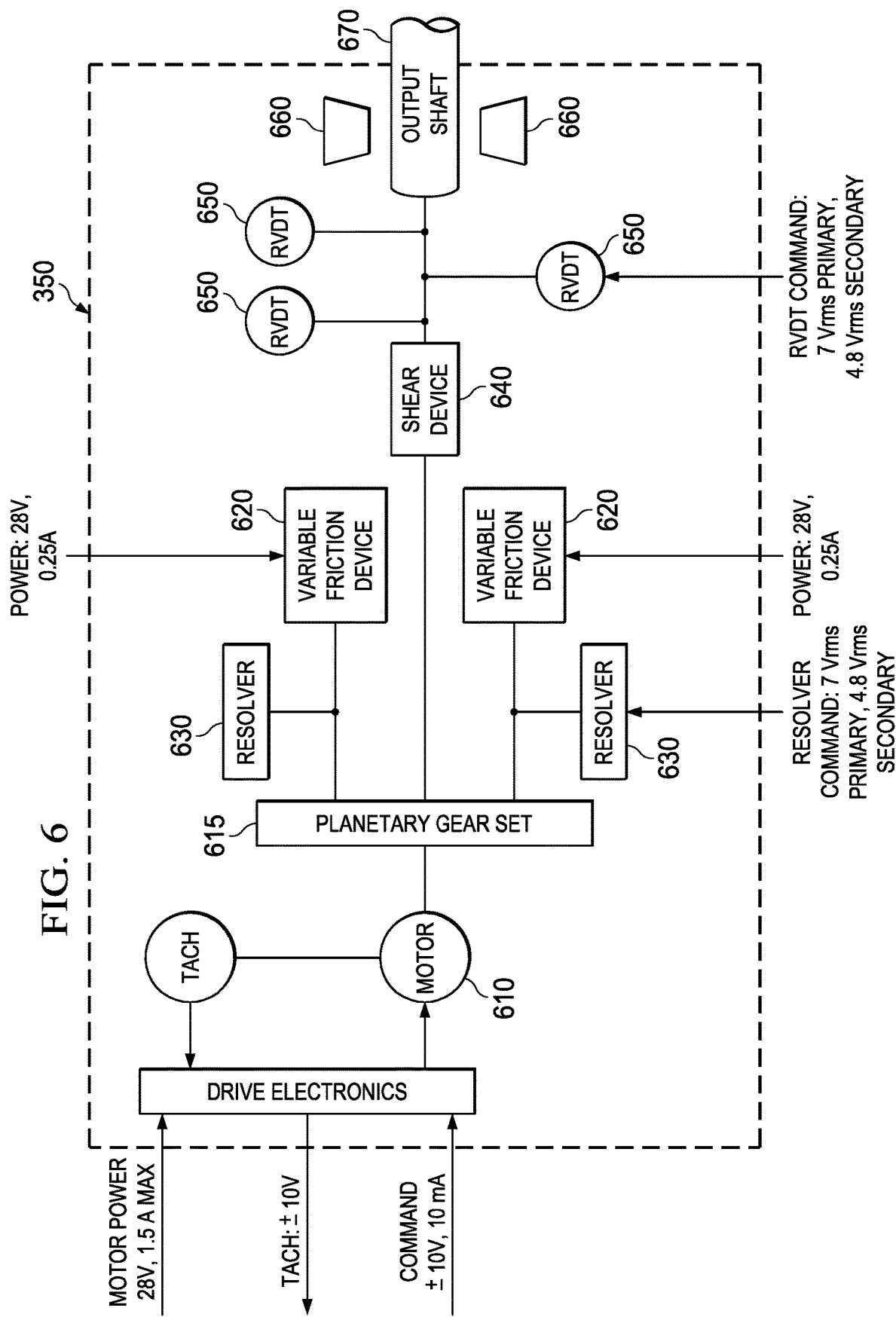
FIG. 6 representatively illustrates a collective trim assembly in accordance with an embodiment.
Figure 7:
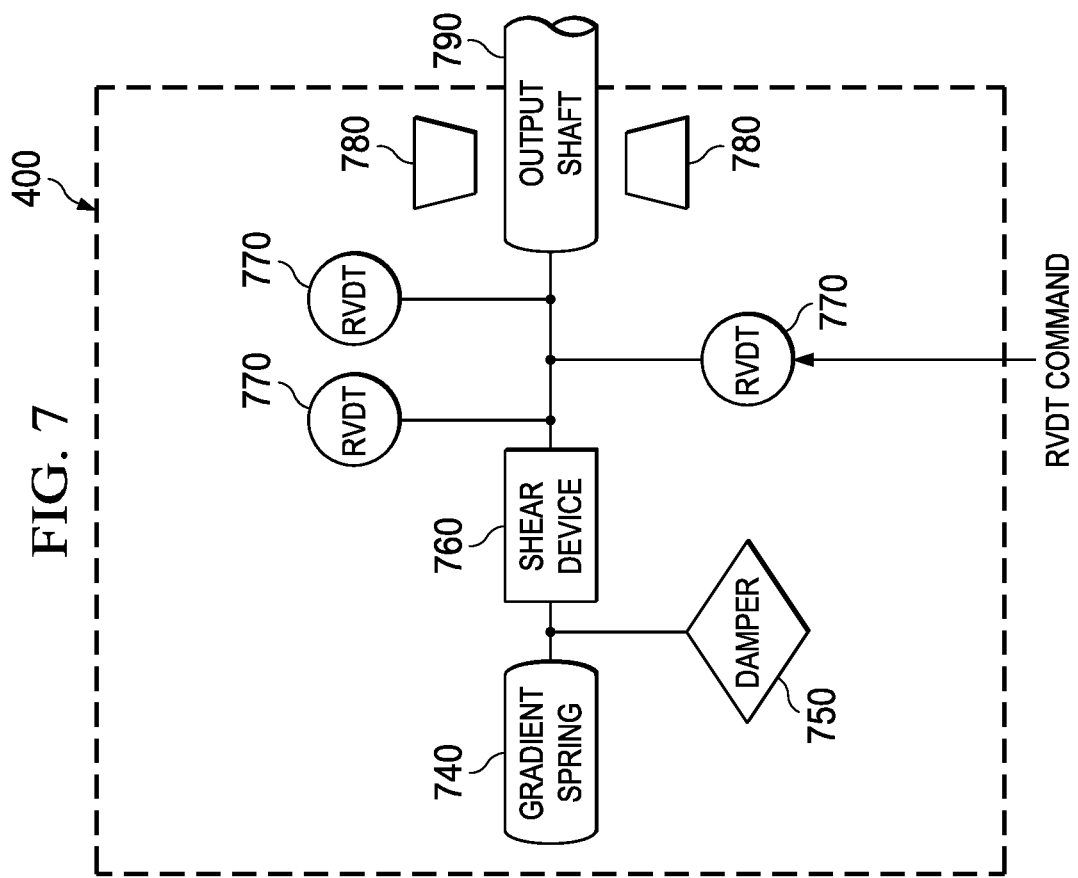
FIG. 7 representatively illustrates an anti-torque trim assembly in accordance with an embodiment.

FIG. 5, FIG. 6, and FIG. 7 show the trim assemblies (300, 350, 400) of FIG. 3 and FIG. 4 according to a representative embodiment. FIG. 5 shows cyclic trim assembly 300 according to an embodiment, FIG. 6 shows collective trim assembly 350 according to an embodiment, and FIG. 7 shows anti-torque trim assembly 400 according to an embodiment.

FIG. 5 representatively illustrates an embodiment of cyclic trim assembly 300 having a trim motor 510, a clutch 515, a run-down damper 520, position measurement devices 530, a gradient spring 540, a damper 550, a shear device 560, position measurement devices 570, mechanical stop devices 580, and an output shaft 590. Although output shaft 590 may be described as a single shaft, it will be appreciated that output shaft 590 may have multiple components. For example, output shaft 590 may include two shafts separated by gradient spring 540. In another example, output shaft 590 may have a single shaft with a torsion spring attached thereto.

In operation according to an embodiment, output shaft 590 and cyclic control assemblies 262 are in mechanical communication such that movement of a pilot control assembly (PCA) grip results in movement of output shaft 590, and movement of output shaft 590 likewise results in movement of the PCA grip. Movement of output shaft 590 may be measured or otherwise determined by position measurement devices 530 and 570. The measurements from measurement devices 530 and 570 may be used to instruct rotor system 110 to change the position of main rotor blades 120.

Cyclic trim assembly 300 may operate in three modes of operation. In a first mode of operation, clutch 515 is engaged and trim motor 510 drives output shaft 590. This first mode of operation may represent, for example, operation of cyclic trim assembly 300 during auto-pilot operations. In this example, trim motor 510 may drive movement of output shaft 590 so as to drive movement of the PCA grip of cyclic control assembly 262. Position measurement devices 530 and 570 may also measure how trim motor 510 drives output shaft 590 and communicate these measurements to rotor system 110.

In a second mode of operation, clutch 515 is disengaged and the pilot drives output shaft 590 by way of cyclic control assembly 262. In this example, the pilot changes the position of output shaft 590, which may be measured by position measurement devices 530 and 570. Position measurement devices 530 and 570 may measure how the pilot drives output shaft 590 and communicate these measurements to rotor system 110.

In a third mode of operation, clutch 515 is engaged and trim motor 510 holds its output arm at a trim position so as to provide a ground point for output shaft 590. In this example, the pilot may change the position of output shaft 590 about the trim position set by trim motor 510. When the pilot releases the PCA grip, the PCA grip may move to the trim position corresponding to the position established by trim motor 510. In some embodiments, the first and third modes of operations may be combined such that trim motor 510 moves the trim position during operation.

Thus, trim motor 510 may provide cyclic force (or trim) to cyclic control assembly 262 through output shaft 590. In an embodiment, trim motor 510 may be a 28 volt DC permanent magnet motor. In operation, trim motor 510 may provide an artificial-force feel (or "force feedback") for a flight control system (FCS) about an anchor point (or "detent"). Clutch 515 provides a mechanism for engaging and disengaging trim motor 510.

FIG. 6 shows an embodiment of collective trim assembly 350 having a trim motor 610, planetary gear set 615, variable friction devices 620, resolvers 630, shear device 640, position measurement devices 650, mechanical stop devices 660, and output shaft 670. Output shaft 670 may be coupled to various linkages. Although output shaft 670 may be described as a single shaft, it will be appreciated that output shaft 670 may comprise multiple components or pieces.

Output shaft 670 and collective control assemblies 264 are in mechanical communication such that movement of a PCA grip of the collective control results in movement of output shaft 670, and movement of output shaft 670 likewise results in movement of the PCA grip. Movement of output shaft 670 may be measured or otherwise determined by position measurement devices 650. Measurements from measurement devices 650 may be used to instruct rotor system 110, e.g., as to how to change the position of main rotor blades 120.

Collective trim assembly 350 may operate in three modes of operation. In a first mode of operation, variable friction devices 620 are engaged and trim motor 610 drives output shaft 670. This first mode of operation may represent, for example, operation of collective trim assembly 350 during auto-pilot operations. In this example, trim motor 610 may drive movement of output shaft 670 so as to drive movement of the PCA grip of collective control assembly 264. Position measurement devices 650 may also measure how trim motor 610 drives output shaft 670 and communicate these measurements to rotor system 110.

In a second mode of operation, variable friction devices 620 are disengaged and the pilot drives output shaft 670 by way of collective control assembly 264. In this example, the pilot changes the position of output shaft 670, which may be measured or otherwise determined by position measurement devices 650. Position measurement devices 650 may measure or otherwise determine how the pilot drives output shaft 670 and communicate these measurements to rotor system 110.

In a third mode of operation, variable friction devices 620 are engaged and trim motor 610 holds its output arm at a trim position so as to provide a ground point for output shaft 670. In this example, the pilot may change the position of output shaft 670 about the trim position set by trim motor 610. When the pilot releases the PCA grip, the PCA grip may move to the trim position corresponding to the position established by trim motor 610. In some embodiments, the first and third modes of operations may be combined such that trim motor 610 moves the trim position during operation.

Thus, trim motor 610 may provide collective force or trim to collective control assembly 264 through output shaft 670. In one example embodiment, trim motor 610 may be a 28 volt DC permanent magnet motor. In operation, trim motor 610 may provide an artificial force feel for an FCS about an anchor point. Variable friction devices 620 provide a mechanism for engaging and disengaging trim motor 610.

FIG. 7 shows an embodiment of anti-torque trim assembly 400 featuring a gradient spring 740, a damper 750, a shear device 760, position measurement devices 770, mechanical stop devices 780, and output shaft 790. Although output shaft 790 may be described as a single shaft, it will be appreciated that output shaft 790 may comprise multiple pieces or components.

In operation, according to an embodiment, output shaft 790 and pedal assemblies 266 are in mechanical communication such that movement of the pedals results in movement of output shaft 790, and movement of output shaft 790 likewise results in movement of the pedals. Movement of output shaft 790 may be measured or otherwise determined by position measurement devices 770. Measurements from measurement devices 770 may be used to instruct rotor system 110, e.g., as to how to change the pitch of tail rotor blades 120' (or how to change operation of an alternative anti-torque system).

Although cyclic control assembly 262, collective control assembly 264, and pedal assemblies 266 may generally control the cyclic, collective, and anti-torque movements of rotorcraft 100 (respectively), generally, aircraft dynamics may result in a coupling of aircraft motions (or flight characteristics). As an example, inputting a change in lateral cyclic into cyclic control assembly 262 may result in a change in the pitch moment of rotorcraft 100. This change in the pitch moment may occur even if no longitudinal cyclic input is provided to cyclic control assembly 262. Rather, this change in the pitch moment would be the result of aircraft dynamics. In such an example, a pilot may apply a counteracting longitudinal cyclic input to compensate for the change in pitch moment. Accordingly, coupling of aircraft flight characteristics generally increases pilot workload.

Different aircrafts may be associated with different couplings of aircraft motions. For example, a rotorcraft with a canted tail rotor may be associated with a high level of coupling due to the "lift" generated by the canted tail rotor combined with normal coupling of yaw motion to collective pitch and coupling of cyclic inputs of conventional single-rotor rotorcraft. In such an example, feedback loops may not be sufficient to compensate for this coupling because feedback loops do not engage until after the coupled response occurs.

Figure 8:
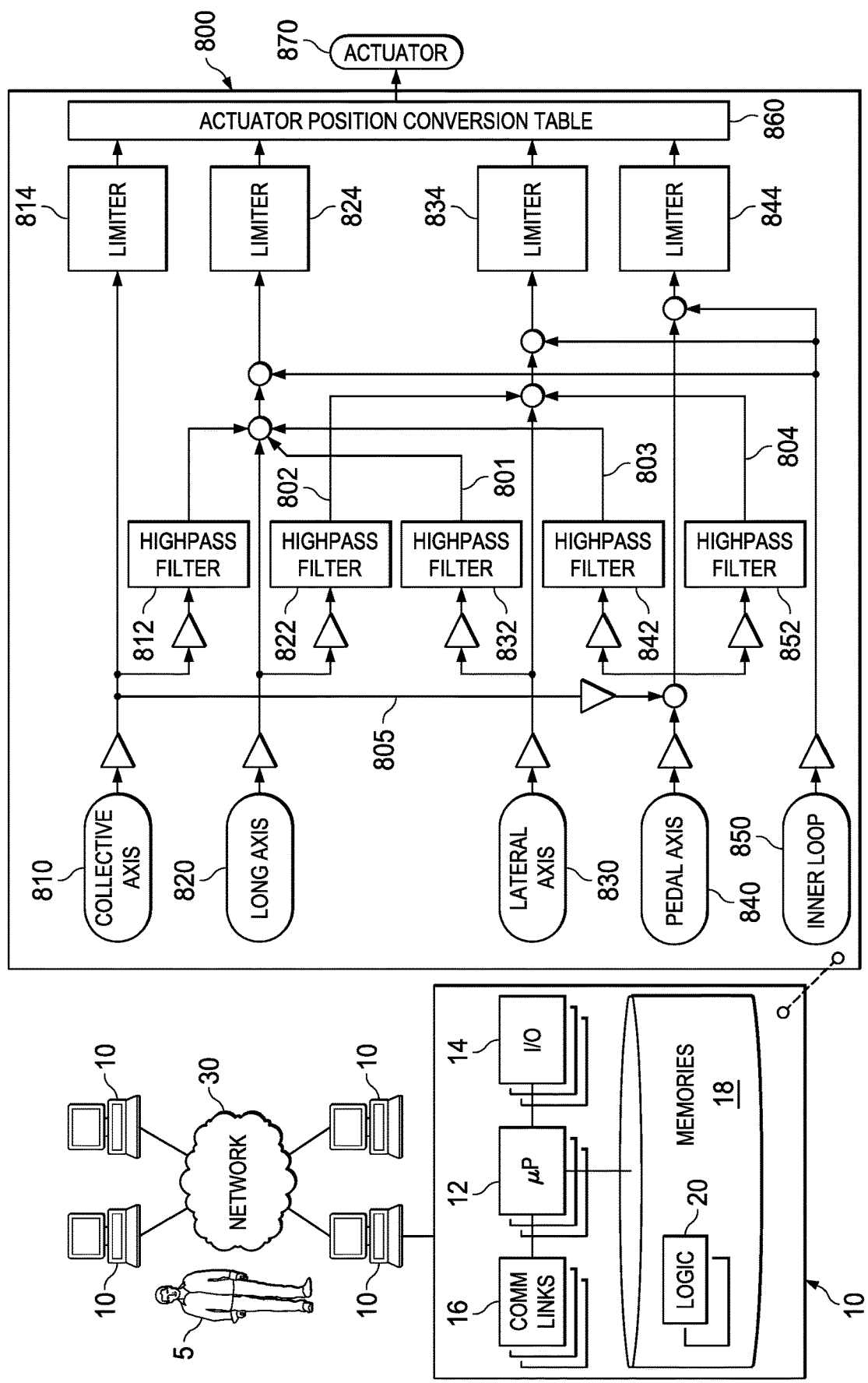
FIG. 8 representatively illustrates a cross-feed arrangement in accordance with and embodiment.

Accordingly, rotorcraft fly-by-wire systems described herein recognize the capability to augment flight control commands with feed-forward control cross-feeds that anticipate inherent coupling of aircraft motions. FIG. 8 shows a fly-by-wire cross-feed arrangement 800. As shown in FIG. 8, cross-feed arrangement 800 has five inputs: collective axis input 810, longitudinal cyclic axis input 820, lateral cyclic axis input 830, pedal axis input 840, and inner loop input 850. Examples of inner loop input 850 will be discussed later with regard to FIG. 9.

As representatively illustrated in FIG. 8, each input may be cross-fed to a different axis. In some examples, high-pass filters (e.g., high-pass filters 812, 822, 832, 842, and 852) may be used to filter cross-feed signals by allowing high-frequency signals to pass, but attenuating frequencies lower than a cut-off frequency. Fixed gains are applied to the inputs before passing through the high-pass filters. The cross-feed signals may then be passed through a limiter (e.g., limiter 814, 824, 834, or 854) to an actuator position converter 860, which processes the signals and converts them into instructions for one or more actuators 870. Each actuator 870 may represent any device that provides flight control inputs to a flight control device. Examples of actuators 870 may include, but are not limited to, a swashplate actuator, a pitch-link actuator, an on-blade actuator, or the like.

The example of FIG. 8 has five representative cross-feeds. A first cross-feed 801 is a lateral cyclic to longitudinal cyclic cross-feed based on providing longitudinal cyclic to cancel the pitch moment generated by a change in lateral cyclic. A second cross-feed 802 is a longitudinal cyclic to lateral cyclic cross-feed based on providing lateral cyclic to cancel the roll moment generated by a change in longitudinal cyclic. A third cross-feed 803 is a pedal axis (e.g., tail rotor collective) to longitudinal cyclic cross-feed based on providing longitudinal cyclic to cancel the pitch moment of the tail rotor collective. A fourth cross-feed 804 is a tail rotor collective to lateral cyclic cross-feed based on providing lateral cyclic to cancel the roll moment of, e.g., the tail rotor collective. A fifth cross-feed 805 is a main rotor collective to tail rotor collective cross-feed based on providing tail rotor collective to cancel the yaw moment of the main rotor collective.

Although FIG. 8 is representatively illustrated with five cross-feeds, more, fewer, or different cross-feed arrangements may be utilized. In general, cross-feeds may be utilized whenever a pilot provides a command to change a first flight characteristic, where changing the first flight characteristic would result in an expected change to a second flight characteristic. The cross-feed may result in an instruction to change a first operating condition of the FCS in response to a received pilot command and an instruction to change a second operating condition in response to the expected change to the second flight characteristic. This second instruction could at least partially offset, counteract, or otherwise address the expected change to the second flight characteristic.

Representative embodiments appreciate that applying cross-feeds to "decouple" an aircraft having coupled flight dynamics may reduce pilot workload by automatically applying cross-feed commands without pilot intervention. For example, in some embodiments, applying decoupling cross-feeds may reduce or eliminate the need for a pilot to apply commands through pilot controls that are intended to at least partially offset the coupled motion(s) of the aircraft. In some circumstances, the FCS may apply cross-feed inputs faster than a pilot could manually. For example, the cross-feeds may anticipate (and therefore more quickly address) inherently coupled aircraft motions or flight characteristics.

Cyclic control assembly 262 may be configured to operate as a displacement-trim device such that movements of the longitudinal stick correlate to the position of the swashplate. In such an example, applying cross-feeds to anticipate inherent coupling of aircraft motions may result in the stick position failing to accurately represent a position of the swashplate, unless or until the trim motor back-drives the pilot control device to match the swashplate position. Continuously driving the stick, especially at high frequency due to aircraft dynamics, however, may increase workload of the pilot trim system and may increase pilot fatigue by transferring transient motions of the swashplate to the pilot's hand and forcing the pilot's hand to follow the stick as the swashplate moves.

Accordingly, teachings of representative embodiments recognize capabilities to wash out cross-feeds over a short period of time such that a displacement-trim flight control device substantially reflects the position of the swashplate during steady-state flight, but does not reflect the position of the swashplate during short transient periods. For example, the trim motor may drive the stick in certain conditions (e.g., during auto-pilot controlled flight or establishing a new trim position), but the FCC may be configured to not command the trim motor to move the pilot control stick in response to application of the cross-feed. In some embodiments, the FCC may be configured to command the motor to move the pilot control stick based on positions of the swashplate during steady-state conditions, and may be configured to not command the motor to move the pilot control stick during transitory conditions.

The wash out time period may be less than about ten seconds (e.g., about 2-7 seconds). In some embodiments, a wash out time period begins when the cross-feed is first applied. In other embodiments, a wash out time period begins after the aircraft returns to steady-state. In some embodiments, the aircraft returns to a same steady-state condition as existing before the cross-feed was applied. In other embodiments, a new steady-state condition may be established after the cross-feed is applied.

Elements of cross-feed arrangement 800 may be implemented at least partially by one or more computer systems 10. All, some, or none of the components of cross-feed arrangement 800 may be located on or near an aircraft, such as rotorcraft 100.

Users 5 may access cross-feed arrangement 800 through computer systems 10. For example, in some embodiments, users 5 may provide flight control inputs that may be processed using a computer system 10. Users 5 may include any individual, group of individuals, entity, machine, or mechanism that interacts with computer systems 10. Examples of users 5 include, but are not limited to, a pilot, a copilot, a service person, an engineer, a technician, a contractor, an agent, an employee, or the like. Users 5 may be associated with an organization. An organization may include any social arrangement that pursues collective goals. One example of an organization is a business. A business is an organization designed to provide goods or services, or both, to consumers, governmental entities, or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although representatively illustrated embodiments depict one example of computer system 10 that may be used, other embodiments may utilize computers other than computer system 10. Additionally, other embodiments may employ multiple computer systems 10 or other computers networked together in one or more public or private computer networks, such as one or more networks 30.

Processors 12 represent devices operable to execute logic contained within a computer-readable medium. Examples of processor 12 include one or more microprocessors, one or more applications, or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, a keyboard, a display, a printer, or the like.

Network interfaces 16 may be operable to facilitate communication between computer system 10 and another element of a network, such as other computer systems 10. Network interfaces (communications link 16) may connect to any number or combination of wireline or wireless networks suitable for data transmission, including transmission of communications.

Memory 18 represents any suitable storage mechanism and may store any data for use by computer system 10. Memory 18 may comprise one or more tangible, computer-readable, or computer-executable storage medium. In some embodiments, memory 18 stores logic 20. Logic facilitates operation of computer system 10. Logic 20 may include hardware, software, or other logic. Logic 20 may be encoded in one or more tangible, non-transitory media and may perform operations when executed by a computer. Logic 20 may include a computer program, software, computer executable instructions, or instructions capable of being executed by computer system 10.

Various communications between computers 10 or components of computers 10 may occur across a network, such as network 30. Network 30 may represent any number and combination of networks suitable for data transmission. Network 30 may, for example, communicate internet protocol packets, frame relay frames, asynchronous transfer mode cells, or other suitable data between network addresses. Although representatively illustrated embodiments show one network 30, other embodiments may include more or fewer networks. Not all elements comprising various network embodiments may communicate via a network. Representative aspects and implementations will appreciate that communications over a network is one example of a mechanism for communicating between parties, and that any suitable mechanism may be used.

Figure 9:
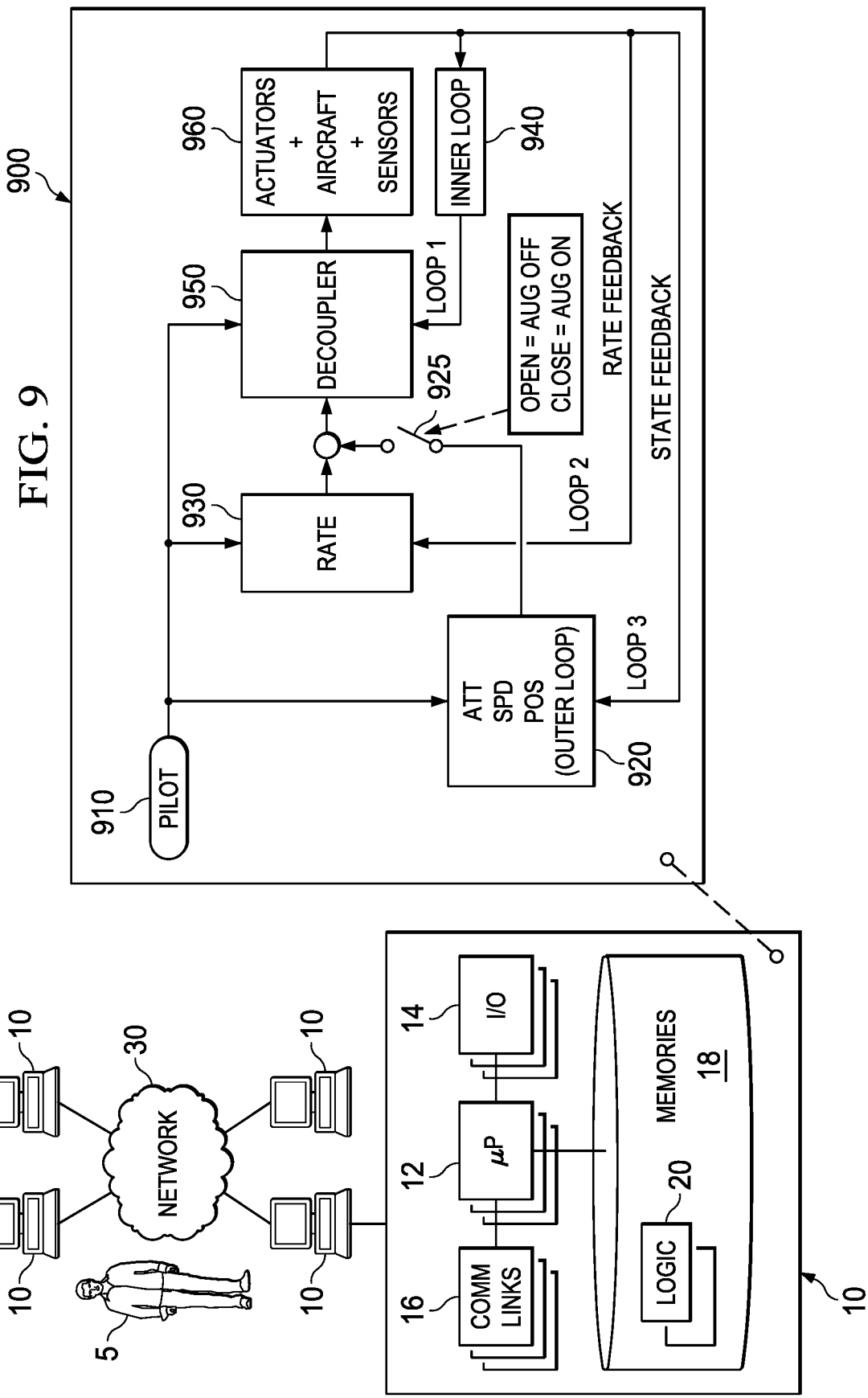
FIG. 9 representatively illustrates a three-loop flight control system in accordance with an embodiment.

FIG. 9 representatively illustrates a three-loop FCS 900 according to an embodiment. Like the cross-feed arrangement 800 of FIG. 8, elements of three-loop FCS 900 may be implemented at least partially by one or more computer systems 10. All, some, or none of the components of three-loop FCS 900 may be located on or near an aircraft such as rotorcraft 100.

The three-loop FCS 900 of FIG. 9 has pilot input 910, outer loop 920, rate (middle) loop 930, inner loop 940, decoupler 950, and aircraft equipment 960. Examples of inner loop 940 and decoupler 950 may include, but are not limited to, cross-feed arrangement 800 and inner loop 850 of FIG. 8. Representative examples of aircraft equipment 960 may include, but are not limited to, actuator position converter 860 and actuators 870 of FIG. 8.

In the example of FIG. 9, a three-loop design separates the inner stabilization and rate feedback loops from outer guidance and tracking loops. The control law structure primarily assigns the overall stabilization task to inner loop 940. Next, middle loop 930 provides rate augmentation. Outer loop 920 focuses on guidance and tracking tasks. Since inner loop 940 and rate loop 930 provide most of the stabilization, less control effort is required at the outer loop level. As representatively illustrated in FIG. 9, switch 925 is provided to turn third-loop flight augmentation on and off.

In some embodiments, the inner loop and rate loop include a set of gains and filters applied to roll/pitch/yaw 3-axis rate gyro and acceleration feedback sensors. Both the inner loop and rate loop may stay active, independent of various outer loop hold modes. Outer loop 920 may include cascaded layers of loops, including an attitude loop, a speed loop, a position loop, a vertical speed loop, an altitude loop, and a heading loop.

The sum of inner loop 940, rate loop 930, and outer loop 920 are applied to decoupler 950. Decoupler 950 approximately decouples the 4-axes (pitch, roll, yaw, and collective pitch (vertical)) such that, for example, the forward longitudinal stick input does not require the pilot to push the stick diagonally. Similarly, as collective pull increases torque and results in an increased anti-torque requirement, decoupler 950 may provide both the necessary pedal and a portion of cyclic (e.g., if rotorcraft 100 has a canted tail rotor) to counter increased torque.

In accordance with representative embodiments, decoupling of plural flight characteristics allows for a control-law-automated, -mediated, or at least-assisted change in pitch angle, roll angle, yaw rate, or collective pitch angle, e.g., to perform a stabilization maneuver to recover from a transient perturbation or disturbance of an otherwise stable operating state.

In flight dynamics, static stability is the initial tendency of a dynamic system to return to a starting stable state after experiencing a perturbation or disturbance of the stable state. For example, a representative stable state may correspond to rotorcraft 100 engaged in forward flight trimmed at 70 knots. After a force is applied to disturb rotorcraft 100 from its trim airspeed, rotorcraft 100 may respond in a variety of ways based on aerodynamic considerations of rotorcraft 100 design. A representative disturbance may correspond to rotorcraft 100 being subjected to a wind gust. In this representative example, the disturbance may operate to increase airspeed. The concept of "stability" involves considerations of what happens after the disturbance is removed or otherwise no longer affects rotorcraft 100.

If rotorcraft 100's tendency is to return to the starting airspeed (e.g., 70 knots in the above-described example), then rotorcraft 100 is said to be "statically stable" with regard to perturbation for the given mode of disturbance. Alternatively, rotorcraft 100 may be described as having positive static stability.

If rotorcraft 100 continues to diverge with increasing airspeed from the trim speed after the disturbance, then rotorcraft 100 is said to be "statically unstable" with regard to perturbation for the given mode of disturbance. Alternatively, rotorcraft 100 may be described as having negative static stability.

If rotorcraft 100 neither returns to the starting airspeed (e.g., 70 knots) nor continues to diverge with increasing airspeed after the disturbance, then rotorcraft 100 is said to have "neutral stability" with regard to perturbation for the given mode of disturbance.

The concept of "dynamic stability" applies to a system that is statically stable. That is, if a system is statically unstable, then dynamic stability is undefined. Dynamic stability relates to time-rated evolution of a system whose response to the perturbation or disturbance is oscillatory. For example, after rotorcraft 100 begins moving toward the original trim point (e.g., 70 knots forward airspeed, in the above-described example), rotorcraft 100 may exhibit a variety of responsive behaviors based on aerodynamic considerations of rotorcraft 100's design.

If rotorcraft 100 returns to the original trim point (e.g., 70 knots) without overshooting the original trim point, then rotorcraft 100 is said to be "statically stable" as well as "dynamically stable" for the given mode of disturbance. If the return-to-trim occurs over a relatively short duration of time, then rotorcraft 100 may also be said to be "well-dampened" for the given mode of disturbance. Alternatively, if the return-to-trim occurs over an excessive duration of time, then rotorcraft 100 may be said to be "over-damped" for the given mode of disturbance.

If rotorcraft 100 overshoots return to the original trim point (e.g., returning to 65 knots instead of the original trim point of 70 knots), then rotorcraft 100 may be said to be "under-damped" for the given mode of disturbance. If, after overshooting return to the original trim, rotorcraft 100's airspeed oscillates with decreasing amplitude about the original trim point (e.g., 70 knots), then rotorcraft 100 may also be said to be "dynamically stable" for the given mode of disturbance. Alternatively, if rotorcraft 100's airspeed oscillates with neither decreasing amplitude nor increasing amplitude about the original trim point (e.g., 70 knots), then rotorcraft 100 may be said to be "statically stable" and to have "dynamic neutral stability," since the oscillations are maintained for the given mode of disturbance. Still alternatively, if rotorcraft 100's airspeed oscillates with increasing amplitude about the original trim point (e.g., 70 knots), then rotorcraft 100 may be said to be "statically stable" and "dynamically unstable" for the given mode of disturbance.

In representative applications, various stability requirements may be prescribed for compliance with government regulations. For example, 14 C.F.R. Appendix B to Part 29—'AIRWORTHINESS CRITERIA FOR HELICOPTER INSTRUMENT FLIGHT' prescribes a minimum speed ($V_{mini}$) for instrument flight. $V_{mini}$ is the slowest airspeed at which a particular rotorcraft is permitted to fly while operating under Instrument Flight Rules (IFR) (e.g., in cloud cover). Above $V_{mini}$, the rotorcraft must meet all requirements of Appendix B for instrument flight. Flight below $V_{mini}$ in Instrument Meteorological Conditions (IMC) is not permitted. In general, a rotorcraft manufacturer selects a speed for $V_{mini}$ and must demonstrate compliance with Appendix B to Part 29 at all airspeeds within the normal flight envelope above $V_{mini}$.

14 C.F.R. Appendix B to Part 29 further requires rotorcraft to demonstrate static longitudinal stability above $V_{mini}$. For example, if the rotorcraft is trimmed at any airspeed above $V_{mini}$ and is then disturbed in pitch (e.g., resulting in an increase or decrease in forward airspeed), then the initial response of the aircraft must be to return to the original speed. Similarly, the rotorcraft must also demonstrate static lateral-directional stability. That is, if the rotorcraft is disturbed in the yaw axis, the initial tendency of the aircraft is to return to yaw trim. Appendix B further prescribes requirements for dynamic stability based on frequency of return-to-trim oscillation.

Rotorcraft tend to be more stable at higher airspeeds. Accordingly, it is easier to meet Appendix B stability requirements at higher forward airspeeds than in hover or low-speed flight.

In certain circumstances, Search and Rescue (SAR) rotorcraft may fly at airspeeds below $V_{mini}$ while in instrument condition. This may occur when starting an approach to hover while still in the clouds. Accordingly, it is possible that a SAR rotorcraft may reach a relatively slow airspeed, or even a hover, without breaking out of the clouds. SAR rotorcraft are typically operated by military organizations that are not subject to Federal Aviation Regulations; however, with increasing prevalence of para-public SAR missions, the Federal Aviation Administration has provided variances for such operations in certain auto-pilot assisted flight modes.

In accordance with representative embodiments and aspects, a rotorcraft may be configured to operate with IMC approval at all speeds in a normal flight envelope of the rotorcraft. In a representative embodiment, rotorcraft 100 may be provisioned with a redundant flight control system. For example, rotorcraft 100 may comprise a plurality of FCCs to provide failover function should one or more FCCs of the plurality of FCCs cease operation or otherwise malfunction. In representative aspects, the plurality of FCCs may comprise a triply-redundant FCC system having three FCCs, with each FCC having dissimilar processing and a secondary data lane. Rotorcraft 100 may further include quadruply-redundant sensors for providing critical data at a relatively high data-availability rate. In a representative implementation, a failure rate (e.g., failure that leads to loss of control laws augmentation of flight dynamics) may be on the order of less than one in one billion. Accordingly, such a robust system may be employed or otherwise adapted to augment flight characteristics of rotorcraft 100 using control modes of the FCC and FCS in order to meet stability requirements.

Figure 10:
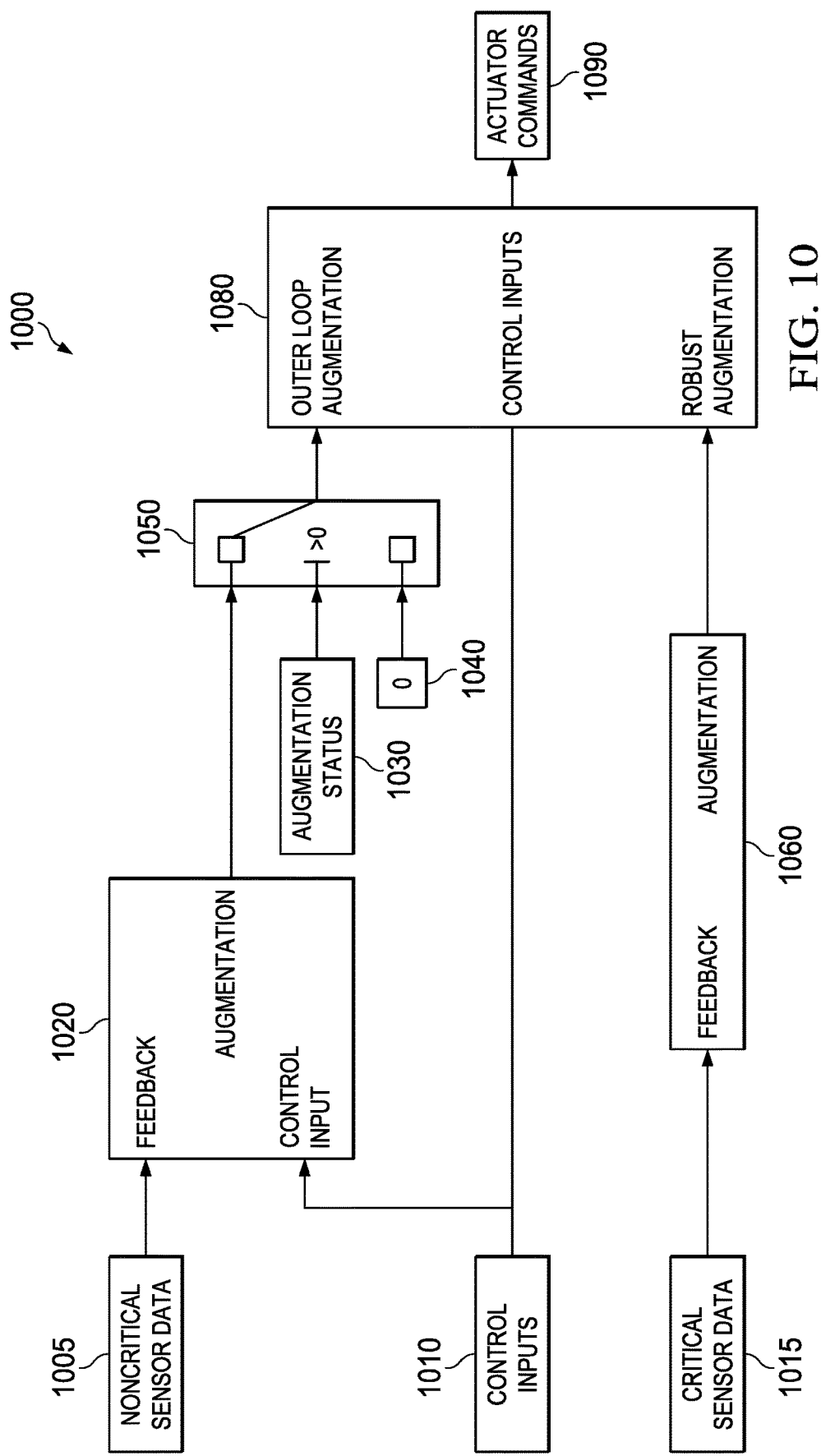
FIG. 10 representatively illustrates an implementation of control laws logic in accordance with an embodiment.
Figure 11:
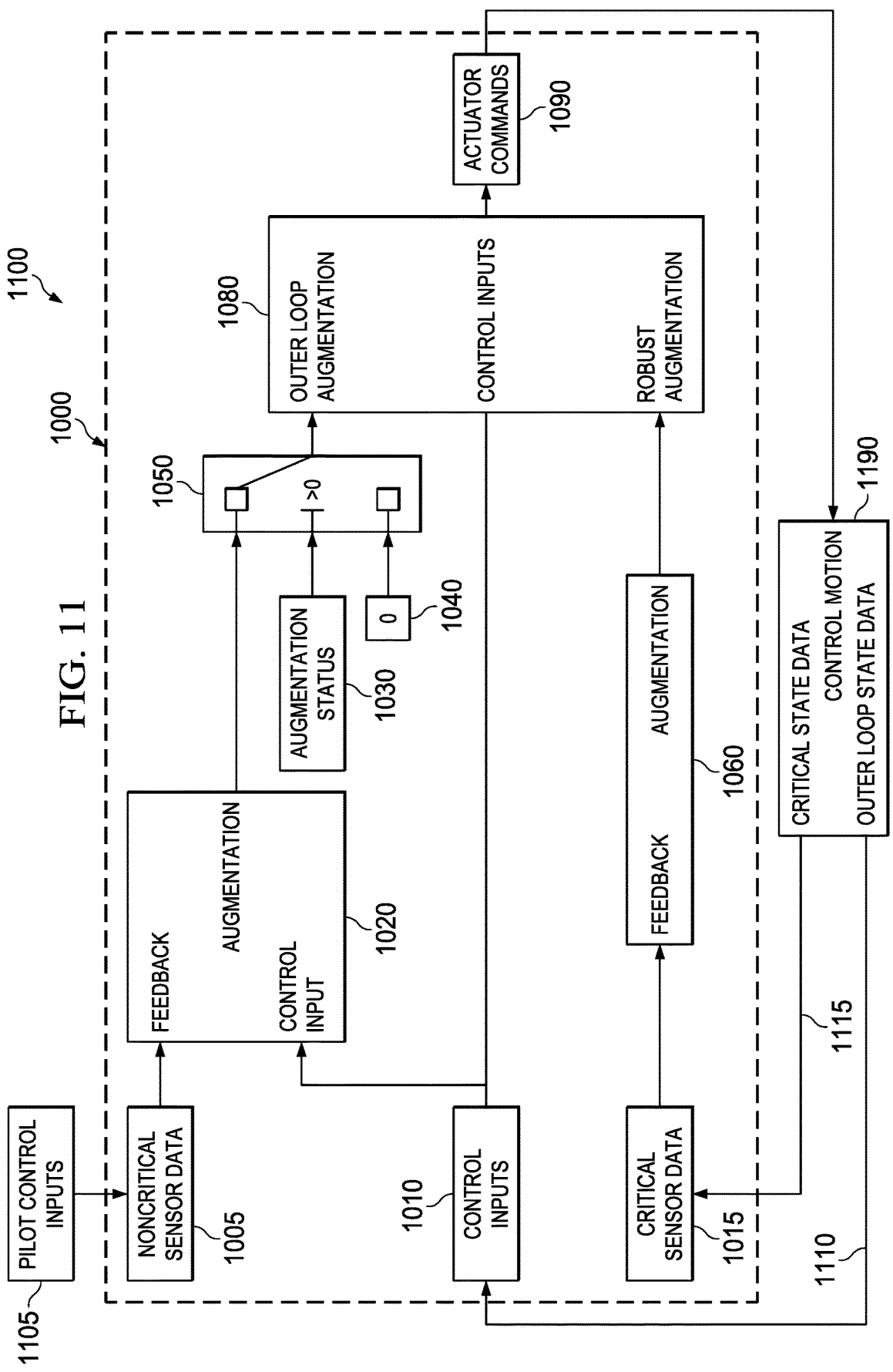
FIG. 11 representatively illustrates an implementation of control laws stabilization augmentation in accordance with an embodiment.

As representatively illustrated in FIG. 10 and FIG. 11, a rotorcraft fly-by-wire control law system in accordance with various representative aspects may be employed to augment flight characteristics of rotorcraft 100 using control operations of the FCC and FCS (without requiring PCA, autopilot, or flight director input) in order to meet stability requirements of 14 C.F.R. Appendix B to Part 29 for the entire flight envelope of rotorcraft 100.

In an embodiment as representatively illustrated in FIG. 10, an FCC control law architecture 1000 provides an augmentation loop employing critical sensor data 1015 to provide stability and control. The inner augmentation loop (e.g., robust controller 1060) is separate from outer loop control 1020 and is active irrespective of the status of the outer loop 1020.

Outer loop 1020 receives noncritical sensor data 1005 and PCA control inputs 1010 to provide control law augmentation signal to switch 1050. Switch 1050 is provided with constant zero-value 1040 and augmentation status signal 1030. If augmentation is active (i.e., greater than zero-value 1040), then outer loop augmentation signal is provided to control effector 1080. If augmentation is not active (i.e., is not greater than zero-value 1040), then outer loop augmentation signal is not provided to control effector 1080 by switch 1050.

Control effector 1080 also receives control signals from control inputs 1010 and augmentation signals (e.g., derived from critical sensor data 1015 feedback) from robust controller 1060. Output of control effector 1080 comprises actuation commands for the FCS.

In an embodiment as representatively illustrated in FIG. 11, a rotorcraft augmentation system 1100 includes rotorcraft plant 1190 and FCC control law architecture 1000. Rotorcraft plant 1190 provides critical state data 1115 and outer loop state data 1110 to FCC control law architecture 1000. In a representative embodiment, FCC control law architecture 1000 provides actuator commands 1090 (e.g., as augmented by robust controller 1060) to rotorcraft plant 1190 for FCS implementation of a stabilization maneuver involving a change of at least one of pitch, roll, yaw, or collective pitch to achieve stabilization of perturbed flight states during operation of rotorcraft 100 (e.g., at airspeeds between 0 knots and about 60 knots) without requiring PCA inputs from a pilot.

Figure 12:
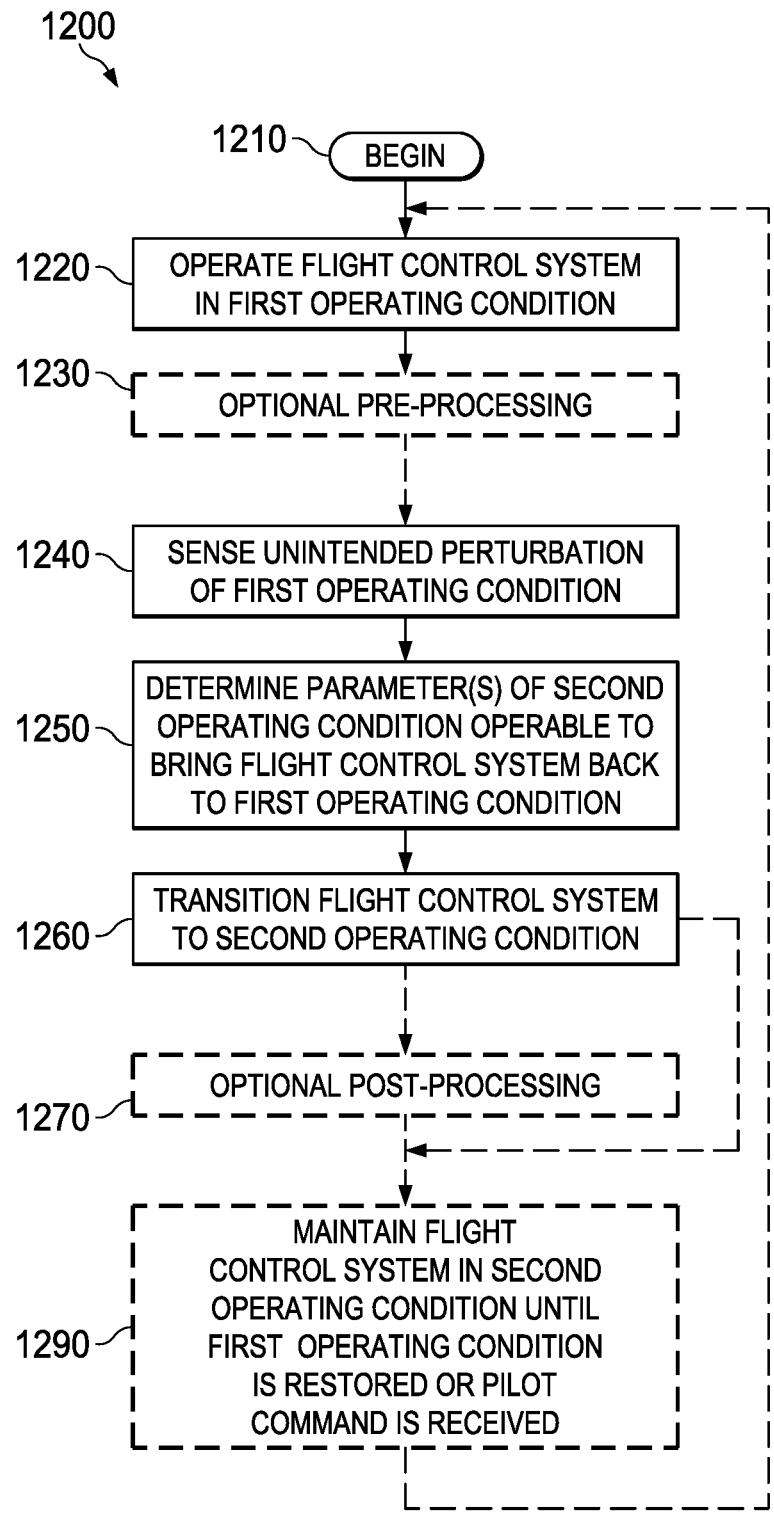
FIG. 12 representatively illustrates a fly-by-wire method for performing a stabilization maneuver in accordance with an embodiment.

In accordance with an embodiment as representatively illustrated in FIG. 12, a method 1200 for implementing an automated, mediated, or assisted stabilization maneuver in control laws begins 1210 with a step 1220 of operating the FCS of rotorcraft 100 in a first operating condition. The first operating condition may be any condition of operating the FCS (e.g., generally regarded as a stable operating condition). For example, the first operating condition may correspond to rotorcraft 100 engaged in forward flight at relatively constant, non-zero velocity. By way of further example, the first operating condition may correspond to rotorcraft 100 engaged in a hover at an airspeed of about 0 knots. Step 1230 represents optional pre-processing that the FCC may engage (or be engaged in) preliminary to the FCC sensing an unintended perturbation or disturbance of the first operating condition in step 1240. For example, optional pre-processing 1230 may comprise control laws performing various adjustments during operation of rotorcraft 100 in the first operating condition 1220. After a perturbation of the first operating condition is sensed in step 1240 that exceeds a threshold value warranting performance of a corrective stabilization maneuver, the FCC determines a pitch angle, roll angle, yaw angle, or collective pitch angle for implementation in performance of the stabilization maneuver (e.g., in response to a transient meteorological condition, such as, wind shear, wind gust, turbulence, or the like). Thereafter the FCS is transitioned to a second operating condition in step 1260 (e.g., the second operating condition corresponding to a stabilization maneuver for bringing rotorcraft 100 back to the first operating condition). Thereafter, FCC may engage optional post-processing in step 1270. For example, optional post-processing 1270 may comprise control laws performing various automated control functions. In step 1290, the second operating condition is maintained until the first operating condition is restored, or until a pilot command is received from the PCA.

Figure 13:
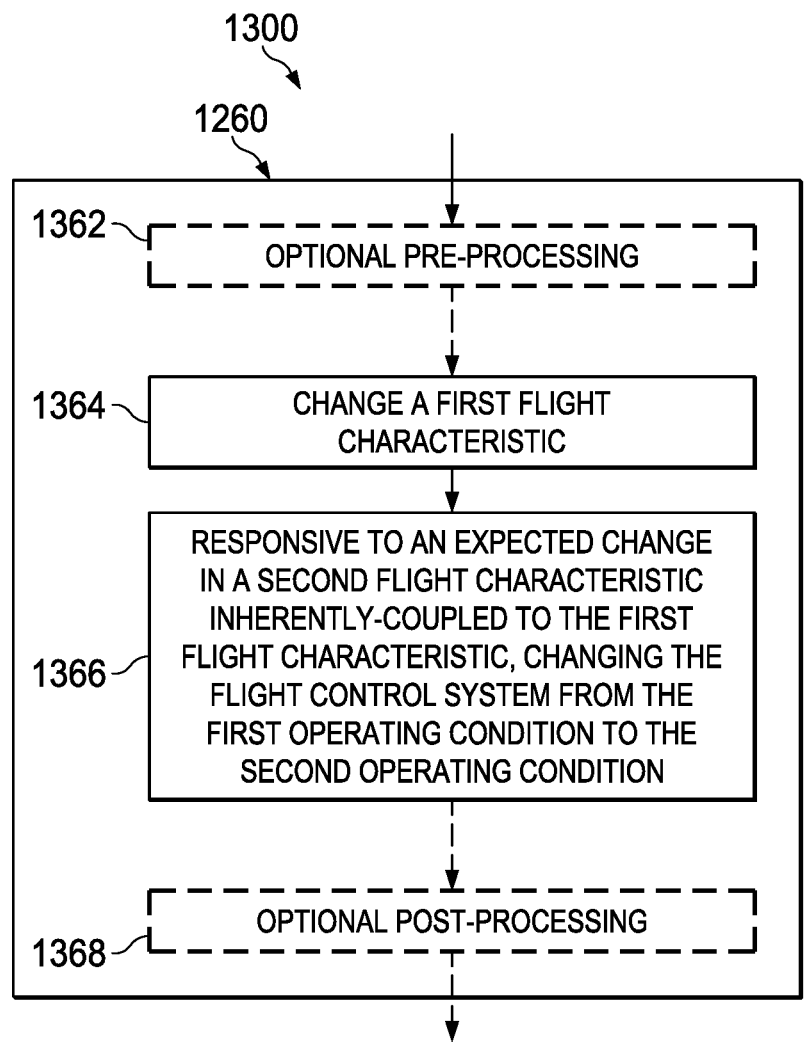
FIG. 13 representatively illustrates a fly-by-wire method for transitioning to a stabilization maneuver in accordance with an embodiment.

In accordance with an embodiment as representatively illustrated in FIG. 13, step 1260 (see also FIG. 12) of transitioning the FCS to a second operating condition includes a step of optional pre-processing 1362. Optional pre-processing 1362 may include the same or similar, or different, elements as optional pre-processing step 1230 of FIG. 12. In step 1364, the FCC makes a change to a first flight characteristic. In step 1366, the FCC changes the first operating condition of the FCS to the second operating condition of the FCS in correspondence to, in congruence with, or otherwise appreciating, an expected change in a second flight characteristic inherently-coupled to, or convolved with, the first flight characteristic (as previously discussed) in order to counteract or otherwise address the expected change in the second flight characteristic (e.g., main rotor tilt engagement to affect a roll maneuver may require modification of collective pitch). Thereafter optional post-processing may be performed in step 1368. Optional post-processing 1368 may identically include or find correspondence to same or similar, or different, elements as optional post-processing step 1270 of FIG. 12. That is to say, some or all of optional post-processing 1368 may be a subset of optional post-processing step 1270 of FIG. 12.

In a representative embodiment, a fly-by-wire (FBW) system includes a rotorcraft flight control computer (FCC) having a control law. The control law is operable to stabilize a rotorcraft in response to a stabilization command, where the stabilization command is configured to return the rotorcraft to a first operating condition from a second operating condition, and where the second operating condition results from an unintended perturbation of the first operating condition. The control law is further operable to permit the rotorcraft to operate with Instrument Meteorological Conditions (IMC) approval at all airspeeds within a normal flight envelope of the rotorcraft. The first operating condition may be a first attitude of the rotorcraft and the second operating condition may be a second attitude of the rotorcraft. The control law may be further operable to at least one of increase or decrease at least one of pitch angle, roll angle, or yaw rate of the rotorcraft. The control law may be further operable to increase or decrease collective pitch angle. The control law may be further operable to stabilize the rotorcraft at airspeeds between 0 knots and about 60 knots.

In another embodiment, a representative method includes a step of operating a rotorcraft in a first operating condition of a flight control system (FCS). The rotorcraft has a flight control computer (FCC) in electrical communication between the FCS and a pilot control assembly (PCA). The FCC senses an unintended perturbation of the first operating condition. In response to the FCC sensing the unintended perturbation, the FCC engages a stabilization maneuver. In response to the FCC engaging the stabilization maneuver, the FCC transitions to a second operating condition of the FCS, wherein the second operating condition is operable to return the rotorcraft to the first operating condition. The FCC transitioning to the second operating condition may comprise steps of: changing a first flight characteristic, wherein changing the first flight characteristic would result in an expected change to a second flight characteristic, and wherein the first flight characteristic and the second flight characteristic have an inherently-coupled relationship; instructing the FCS to change the first operating condition of the FCS based on the inherently-coupled relationship; and in response to the expected change to the second flight characteristic, instructing the FCS to transition to the second operating condition of the FCS, where the second operating condition is operable to at least partially offset the expected change to the second flight characteristic such that the FCS is operable to at least partially decouple the inherently-coupled relationship of the first flight characteristic and the second flight characteristic. The first operating condition may be a first attitude of the rotorcraft and the second operating condition may be a second attitude of the rotorcraft. The stabilization maneuver may comprise an increase or a decrease of pitch, roll, yaw of the rotorcraft. The stabilization maneuver may comprise increasing or decreasing forward airspeed of the rotorcraft. The stabilization maneuver may comprise increasing or decreasing collective pitch angle of the rotor system. The method may further comprise the FCC maintaining the stabilization maneuver until the rotorcraft is returned to the first operating condition. The method may further comprise the FCC maintaining the stabilization maneuver until the FCC receives a pilot command. The method may further comprise the FCC receiving the pilot command from a cyclic control of the PCA or a collective control of the PCA. The method may further comprise the FCC determining the first attitude of the rotorcraft from a first sensor and the second attitude of the rotorcraft from a second sensor. The first sensor may be different than the second sensor. The method may further comprise the FCC determining forward airspeed from at least one sensor of the rotorcraft. The first operating condition may comprise the rotorcraft not being piloted or otherwise controlled by an autopilot system or flight director system. The first operating condition may be maintained without input from the PCA. Reestablishing the first operating condition after perturbation may be accomplished without input from the PCA. The unintended perturbation may comprise a transient meteorological condition. The transient meteorological condition may comprise wind shear, wind gust, turbulence, or the like. The first operating condition may comprise the rotorcraft hovering. The first operating condition may comprise the rotorcraft having a forward airspeed of about 0 knots (e.g., a hover). The first operating condition may comprise the rotorcraft engaged in forward flight at an airspeed of less than about 60 knots. The first operating condition may comprise the rotorcraft engaged in forward flight at an airspeed of less than about 45 knots. The method may be further operable to permit the rotorcraft to engage operations with Instrument Meteorological Conditions (IMC) approval at substantially all airspeeds within a normal flight envelope of the aircraft."

In yet another representative embodiment, a rotorcraft comprises a power train coupled to a body. The power train comprises a power source and a drive shaft coupled to the power source. A rotor system is coupled to the power train and comprises a plurality of rotor blades. A flight control system (FCS) is operable to change at least one operating condition of the rotor system. A pilot control assembly (PCA) is configured to receive commands from a pilot. The FCS comprises a fly-by-wire flight control system in electrical communication with the PCA. A flight control computer (FCC) is in electrical communication between the FCS and the PCA. The FCC is configured to: sense a stable state of the rotorcraft, where the stable state corresponds to a first operating condition; sense a perturbation of the stable state of the rotorcraft; in response to sensing the perturbation, engage a stabilization maneuver; and in response to engaging the stabilization maneuver, transition to a second operating condition of the rotor system. The second operating condition of the rotor system is configured to return the rotorcraft to the stable state. The FCC may be further configured to: alter a first flight characteristic, wherein alteration of the first flight characteristic would result in an anticipated change to a second flight characteristic; instruct the FCS to change a first operating condition of the rotor system based on a convolved relationship between the first flight characteristic and the second flight characteristic; and in response to the anticipated change to the second flight characteristic, instruct the FCS to transition to the second operating condition of the rotor system, wherein the second operating condition of the rotor system is operable to at least partially counter the anticipated change to the second flight characteristic such that the FCS is operable to at least partially separate convolved flight characteristics. The stable state may be a first attitude of the rotorcraft and the perturbation of the stable state may be a second attitude of the rotorcraft different than the first attitude. The stabilization maneuver may comprise an increase or decrease of pitch of the rotorcraft. The stabilization maneuver may comprise an increase or decrease of roll of the rotorcraft. The stabilization maneuver may comprise an increase or decrease of yaw of the rotorcraft. The stabilization maneuver may comprise an increase or decrease of collective pitch of the rotor system. The stabilization maneuver may comprise an increase or decrease of forward airspeed of the rotorcraft. The FCC may be further configured to determine the first attitude of the rotorcraft from a first sensor and the second attitude of the rotorcraft from a second sensor. The FCC may be further configured to maintain the stabilization maneuver until the rotorcraft is returned to the stable state or until the FCC receives a pilot command. The pilot command may be received from a cyclic control or a collective control of the PCA. The FCC may be further configured to determine forward airspeed from at least one sensor of the rotorcraft. The first operating condition may comprise the rotorcraft not being piloted by an autopilot or a flight director. The first operating condition may be reestablished after perturbation or thereafter maintained without pilot input from the PCA. The perturbation may comprise wind shear, wind gust, or turbulence. The first operating condition may comprise at least one of: the rotorcraft hovering; the rotorcraft having a forward airspeed of about 0 knots; the rotorcraft engaged in forward flight at an airspeed of less than about 60 knots; or the rotorcraft engaged in forward flight at an airspeed of less than about 45 knots. The rotor system may comprise at least one of a main rotor system and a tail rotor system. The rotorcraft may be configured to operate with IMC approval at all airspeeds within a normal flight envelope of the rotorcraft.

As used herein, the terms "comprises," "comprising," "includes," "including," "has," "having," or any contextual variant thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Furthermore, unless expressly stated to the contrary, "or" refers to an inclusive or and not an exclusive or. That is, the term "or" as used herein is generally intended to mean "and/or" unless otherwise indicated. For example, a condition "A or B" is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural connotations for such term, unless the context clearly indicates otherwise.

As used herein, the terms "measure," "measuring," "measurement," "determining," "determination," "detecting," "detection," "detector," "sensing," "sensor," or contextual variants thereof, refer to functions or device components that assign or otherwise provide an output value for at least one of a direct measurement, an in-direct measurement, or a computed measurement. For example, a determination or detection of an angle between two lines may comprise a direct measurement of the angle between the lines, an indirect measurement of the angle (e.g., as in the case of extending the length of two non-parallel lines outside the area of observation so as to predict their angle of intersection), or a computed measurement (e.g., using trigonometric functions to calculate an angle). Accordingly, "determining" the angle of intersection may be regarded as equivalent to "detecting" the angle of intersection, and a "detector" for determining the angle may be regarded as directly measuring, indirectly measuring, or computing the angle between the lines.

As previously discussed, representative embodiments of the disclosure may be implemented in a computer communicatively coupled to a network. The network may include, for example, a public network, a private network, the Internet, an intranet, an internet, a wide area network (WAN), a local area network (LAN), a storage area network (SAN), a personal area network (PAN), a metropolitan area network (MAN), a satellite network, a public switched telephone network (PSTN), a cellular network, an optical network, a local network, a regional network, a global network, a wireless network, a wireline network, another computer, a standalone computer, or the like. As is known to those skilled in the art, a computer may include a central processing unit ("CPU") or processor, at least one read-only memory ("ROM"), at least one random access memory ("RAM"), at least one hard disc drive ("HDD"), and one or more input/output ("I/O") devices. I/O devices may include a keyboard, monitor, printer, electronic pointing device (e.g., mouse, trackball, stylus, etc.), or the like. In various embodiments, a server computer may have access to at least one database over a network. The database may be local or remote to a server computer.

Additionally, representative functions may be implemented on one computer or shared, or otherwise distributed, among two or more computers in or across a network. Communications between computers may be accomplished using any electronic signals, optical signals, radio frequency signals, or other suitable methods or tools of communication in compliance with network protocols now known or otherwise hereafter derived. It will be understood for purposes of this disclosure that various flight control embodiments may comprise one or more computer processes, computing devices, or both, configured to perform one or more functions. One or more interfaces may be presented that can be utilized to access these functions. Such interfaces include application programming interfaces (APIs), interfaces presented for remote procedure calls, remote method invocation, or the like.

Any suitable programming language(s) can be used to implement the routines, methods, programs, or instructions of embodiments described herein, including; e.g., C, C #, C++, Java, Ruby, MATLAB, Simulink, assembly language, or the like. Different programming techniques may be employed, such as procedural or object oriented ontologies. Any particular routine can execute on a single computer processing device or multiple computer processing devices, a single computer processor, or multiple computer processors. Data may be stored in a single storage medium or distributed across multiple storage mediums, and may reside in a single database or multiple databases (or other data storage techniques).

Although steps, operations, or computations may be presented in a specific order, this order may be changed in different embodiments. In some embodiments, to the extent multiple steps are shown as sequential in the preceding description, some combination of such steps in alternative embodiments may be performed at a same time. The sequence of operations described herein may be interrupted, suspended, or otherwise controlled by another process, such as an operating system, kernel, daemon, or the like. The routines can operate in an operating system environment or as stand-alone routines. Functions, routines, methods, steps, or operations described herein can be performed in hardware, software, firmware, or any combination thereof.

Embodiments described herein may be implemented in the form of control logic in software or hardware, or a combination of both. Control logic may be stored in an information storage medium, such as a computer-readable medium, as a plurality of instructions adapted to direct an information processing device to perform a set of steps disclosed in various embodiments. Based on the disclosure and teachings provided herein, a person of ordinary skill in the art will appreciate other ways or methods to implement similar, or substantially similar, functionality.

It is also within the spirit and scope herein to implement, in software, programming, or other steps, operations, methods, routines, or portions thereof described herein, where such software programming or code can be stored in a computer-readable medium and can be operated on by a processor to permit a computer to perform any of the steps, operations, methods, routines, or portions thereof described herein. Embodiments may be implemented using software programming or code in one or more general purpose digital computers, by using, e.g., application specific integrated circuits (ASICs), programmable logic devices, field programmable gate arrays (FPGAs), or optical, quantum, or nano-engineered systems, components, or mechanisms. In general, functions disclosed herein may be achieved by any means, whether now known or hereafter derived in the art. For example, distributed or networked systems, components, or circuits can be used. In another example, communication or transfer (or otherwise moving from one place to another) of data may be wired, wireless, or accomplished by any other means.

A "computer-readable medium" may be any medium that can contain, store, communicate, propagate, or transport a program for use by or in connection with the instruction execution system, apparatus, system, or device. The computer-readable medium can be, but is not limited to, an electronic, magnetic, optical, electromagnetic, infrared, or semiconductor system, apparatus, system, device, propagation medium, or computer memory. Such computer-readable medium will generally be machine readable and include software programming or code susceptible to being human readable (e.g., source code) or machine readable (e.g., object code).

A "processor" includes any hardware system, mechanism or component that processes data, signals, or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," or the like. Portions of processing may be performed at different (or same) times and at different (or same) locations by different (or same) processing systems.

It will also be appreciated that one or more elements depicted in the Figures may also be implemented in a more-separated or more-integrated manner, or even removed or rendered inoperable in certain cases, as may be useful in accordance with particular applications and embodiments. Additionally, any signal lines or arrows in the Figures should be considered only as representative, and therefore not limiting, unless otherwise specifically noted.

Examples or illustrations provided herein are not to be regarded in any way as restrictions on, limits to, or express definitions of any term or terms with which they are associated. Instead, these examples or illustrations are to be regarded as being described with respect to a particular embodiment and as merely illustrative. Those skilled in the art will appreciate that any term or terms with which these examples or illustrations are associated will encompass other embodiments that may or may not be given therewith or elsewhere in the specification, and all such embodiments are intended to be included within the scope of that term or terms. Language designating such non-limiting examples and illustrations includes, but is not limited to: "for example," "for instance," "e.g.," "etc., "or the like," "in a representative embodiment," "in one embodiment," "in another embodiment," or "in some embodiments." Reference throughout this specification to "one embodiment," "an embodiment," "a representative embodiment," "a particular embodiment," or "a specific embodiment," or contextually similar terminology, means that a particular feature, structure, property, or characteristic described in connection with the described embodiment is included in at least one embodiment, but may not necessarily be present in all embodiments. Thus, respective appearances of the phrases "in one embodiment," "in an embodiment," or "in a specific embodiment," or similar terminology in various places throughout the description are not necessarily referring to the same embodiment. Furthermore, particular features, structures, properties, or characteristics of any specific embodiment may be combined in any suitable manner with one or more other embodiments.

The scope of the present disclosure is not intended to be limited to the particular embodiments of any process, product, machine, article of manufacture, assembly, apparatus, means, methods, or steps herein described. As one skilled in the art will appreciate, various processes, products, machines, articles of manufacture, assemblies, apparatuses, means, methods, or steps, whether presently existing or later developed, that perform substantially the same function or achieve substantially the same result in correspondence to embodiments described herein, may be utilized according to their description herein. The appended claims are intended to include within their scope such processes, products, machines, articles of manufacture, assemblies, apparatuses, means, methods, or steps.

Benefits, other advantages, and solutions to problems have been described herein with regard to representative embodiments. However, any benefits, advantages, solutions to problems, or any component thereof that may cause any benefit, advantage, or solution to occur or to become more pronounced are not to be construed as critical, required, or essential features or components.

What is claimed is:

1. A rotorcraft, comprising:
    a power train coupled to a body, the power train comprising a power source and a drive shaft coupled to the power source;
    a rotor system coupled to the power train and comprising a plurality of rotor blades;
    a flight control system (FCS) operable to change at least one operating condition of the rotor system;
    a pilot control assembly (PCA) configured to receive commands from a pilot, wherein the FCS is a fly-by-wire flight control system in electrical communication with the PCA; and
    a flight control computer (FCC) in electrical communication between the FCS and the PCA, the FCC configured to:
        sense a stable state of the rotorcraft, wherein the stable state corresponds to a first operating condition;
        sense an unintended perturbation of the stable state of the rotorcraft;
        in response to sensing the unintended perturbation, engage a stabilization maneuver; and
        in response to engaging the stabilization maneuver, transition to a second operating condition of the rotor system, wherein the second operating condition of the rotor system is configured to return the rotorcraft to the stable state;
    and wherein the FCC is further configured to:
        alter a first flight characteristic, wherein alteration of the first flight characteristic would result in an anticipated change to a second flight characteristic;
        instruct the FCS to change a first operating condition of the rotor system based on a convolved relationship between the first flight characteristic and the second flight characteristic; and
        in response to the anticipated change to the second flight characteristic, instruct the FCS to transition to the second operating condition of the rotor system, wherein the second operating condition of the rotor system is operable to at least partially counter the anticipated change to the second flight characteristic such that the FCS is operable to at least partially separate convolved flight characteristics.

2. The rotorcraft of claim 1, wherein the stable state is a first attitude of the rotorcraft and the unintended perturbation of the stable state is a second attitude of the rotorcraft different than the first attitude.

3. The rotorcraft of claim 2, wherein the stabilization maneuver comprises at least one of:
an increase or decrease of pitch of the rotorcraft;
an increase or decrease of roll of the rotorcraft;
an increase or decrease of yaw of the rotorcraft; or
an increase or decrease of collective pitch of the rotor system.

4. The rotorcraft of claim 3, wherein the FCC is further configured to determine the first attitude of the rotorcraft from a first sensor and the second attitude of the rotorcraft from a second sensor.

5. The rotorcraft of claim 4, wherein the FCC is further configured to maintain the stabilization maneuver until the rotorcraft is returned to the stable state or until the FCC receives a pilot command.

6. The rotorcraft of claim 5, wherein the pilot command is received from a cyclic control or a collective control of the PCA.

7. The rotorcraft of claim 3, wherein the FCC is further configured to determine forward airspeed from at least one sensor of the rotorcraft.

8. The rotorcraft of claim 3, wherein the first operating condition comprises the rotorcraft not being piloted by an autopilot and the first operating condition is maintained without pilot input from the PCA.

9. The rotorcraft of claim 1, wherein the unintended perturbation comprises wind shear, wind gust, or turbulence.

10. The rotorcraft of claim 9, wherein the first operating condition comprises at least one of:
the rotorcraft hovering;
the rotorcraft having a forward airspeed of about 0 knots;
the rotorcraft engaged in forward flight at an airspeed of less than about 60 knots; or
the rotorcraft engaged in forward flight at an airspeed of less than about 45 knots.

11. The rotorcraft of claim 1, wherein at least one of:
the rotor system comprises at least one of a main rotor system and a tail rotor system; or
the rotorcraft is configured to operate with IMC approval at all airspeeds within a normal flight envelope.

12. A method, comprising:
operating a rotorcraft in a first operating condition of a flight control system (FCS) the FCS being operable to change at least one operating condition of the rotorcraft and being a fly-by-wire flight control system in electrical communication with a pilot control assembly (PCA), the rotorcraft having a flight control computer (FCC) in electrical communication between the FCS and the PCA configured to receive commands from a pilot, the rotorcraft including a power train coupled to a body, the power train comprising a power source and a drive shaft coupled to the power source, and a rotor system coupled to the power train and comprising a plurality of rotor blades;
the FCC sensing a stable state of the rotorcraft, wherein the stable state corresponds to a first operating condition;
the FCC sensing an unintended perturbation of the first operating condition;
in response to the FCC sensing the unintended perturbation, the FCC engaging a stabilization maneuver; and
in response to the FCC engaging the stabilization maneuver, the FCC transitioning to a second operating condition of the FCS, wherein the second operating condition is operable to return the rotorcraft to the first operating condition;
altering a first flight characteristic, wherein alteration of the first flight characteristic would result in an anticipated change to a second flight characteristic;
instructing the FCS to change a first operating condition of the rotor system based on a convolved relationship between the first flight characteristic and the second flight characteristic; and
in response to the anticipated change to the second flight characteristic, instruct the FCS to transition to the second operating condition of the rotor system, wherein the second operating condition of the rotor system is operable to at least partially counter the anticipated change to the second flight characteristic such that the FCS is operable to at least partially separate convolved flight characteristic.

13. The method of claim 12, wherein the FCC transitioning to the second operating condition comprises:
changing a first flight characteristic, wherein changing the first flight characteristic would result in an expected change to a second flight characteristic, and wherein the first flight characteristic and the second flight characteristic have an inherently-coupled relationship;
instructing the FCS to change the first operating condition of the FCS based on the inherently-coupled relationship; and
in response to the expected change to the second flight characteristic, instructing the FCS to transition to the second operating condition of the FCS, wherein the second operating condition is operable to at least partially offset the expected change to the second flight characteristic such that the FCS is operable to at least partially decouple the inherently-coupled relationship of the first flight characteristic and the second flight characteristic.

14. The method of claim 13, wherein at least one of:
the first operating condition is a first attitude of the rotorcraft, and the second operating condition is a second attitude of the rotorcraft;
the stabilization maneuver comprises at least one of an increase or a decrease of pitch, roll, or yaw of the rotorcraft;
the stabilization maneuver comprises at least one of increasing or decreasing forward airspeed of the rotorcraft;
the stabilization maneuver comprises at least one of increasing or decreasing collective pitch;
the method further comprises the FCC maintaining the stabilization maneuver until the rotorcraft is returned to the first operating condition;
the method further comprises the FCC maintaining the stabilization maneuver until the FCC receives a pilot command;
the method further comprises the FCC receiving the pilot command from a cyclic control of the PCA or a collective control of the PCA;
the method further comprises the FCC determining the first attitude of the rotorcraft from a first sensor and the second attitude of the rotorcraft from a second sensor;
the first sensor is different than the second sensor;
the method further comprises the FCC determining forward airspeed from at least one sensor of the rotorcraft;

the first operating condition comprises the rotorcraft not being piloted by an autopilot;
the first operating condition is maintained without input from the PCA;
the unintended perturbation comprises a transient meteorological condition;
the transient meteorological condition comprises wind shear, wind gust, or turbulence;
the first operating condition comprises the rotorcraft hovering;
the first operating condition comprises the rotorcraft having a forward airspeed of about 0 knots;
the first operating condition comprises the rotorcraft engaged in forward flight at an airspeed of less than about 60 knots;
the first operating condition comprises the rotorcraft engaged in forward flight at an airspeed of less than about 45 knots; or
the method is operable to permit the rotorcraft to operate with Instrument Meteorological Conditions (IMC) approval at all airspeeds within a normal flight envelope of the rotorcraft.

15. A rotorcraft, comprising:
a rotor system coupled to a power train and comprising a plurality of rotor blades;
a flight control system (FCS) operable to change at least one operating condition of the rotor system;
a pilot control assembly (PCA) configured to receive commands from a pilot, wherein the FCS is a fly-by-wire flight control system in electrical communication with the PCA; and
a flight control computer (FCC) in electrical communication between the FCS and the PCA, the FCC configured to:
sense a stable state of the rotorcraft, wherein the stable state corresponds to a first operating condition;
sense an unintended perturbation of the stable state of the rotorcraft;
in response to sensing the unintended perturbation, engage a stabilization maneuver; and
in response to engaging the stabilization maneuver, transition to a second operating condition of the rotor system, wherein the second operating condition of the rotor system is configured to return the rotorcraft to the stable state, and wherein the FCC is further configured to:
return the rotorcraft to a first operating condition from a second operating condition, the second operating condition comprising a perturbation of the first operating condition; and
permit the rotorcraft to operate with Instrument Meteorological Conditions (IMC) approval at substantially all airspeeds within a normal flight envelope of the rotorcraft;
and wherein the FCC is further configured to:
alter a first flight characteristic, wherein alteration of the first flight characteristic would result in an anticipated change to a second flight characteristic;
instruct the FCS to change a first operating condition of the rotor system based on a convolved relationship between the first flight characteristic and the second flight characteristic; and
in response to the anticipated change to the second flight characteristic, instruct the FCS to transition to the second operating condition of the rotor system, wherein the second operating condition of the rotor system is operable to at least partially counter the anticipated change to the second flight characteristic such that the FCS is operable to at least partially separate convolved flight characteristics.

16. The rotorcraft of claim 15, wherein the first operating condition is a first attitude of the rotorcraft and the second operating condition is a second attitude of the rotorcraft.

17. The rotorcraft of claim 15, wherein the FCC is further configured to at least one of increase or decrease at least one of pitch angle, roll angle, or yaw rate of the rotorcraft.

18. The rotorcraft of claim 15, wherein the FCC is further configured to increase or decrease collective pitch angle.

19. The rotorcraft of claim 15, wherein the FCC is further configured to stabilize the rotorcraft at airspeeds between 0 knots and about 60 knots.

* * * * *